(12) United States Patent
Miwa et al.

(10) Patent No.: US 7,774,401 B2
(45) Date of Patent: *Aug. 10, 2010

(54) NETWORK DATA PROCESSING SYSTEM, A NETWORK PRINTING SYSTEM, A DATA PROCESSING UNIT, A PRINTER, A DATA PROCESSING PROGRAM AND A PRINTING PROCESSING PROGRAM, AND A NETWORK DATA PROCESSING METHOD AND A NETWORK PRINTING METHOD

(75) Inventors: Shinji Miwa, Nirasaki (JP); Atsushi Nagahara, Chino (JP)

(73) Assignee: Seiko Epson Corporation (JP)

( * ) Notice: Subject to any disclaimer, the term of this patent is extended or adjusted under 35 U.S.C. 154(b) by 1769 days.

This patent is subject to a terminal disclaimer.

(21) Appl. No.: 10/914,047

(22) Filed: Aug. 6, 2004

(65) Prior Publication Data
US 2005/0066051 A1 Mar. 24, 2005

(30) Foreign Application Priority Data
Aug. 8, 2003 (JP) ............................. 2003-290451
May 31, 2004 (JP) ............................. 2004-161670

(51) Int. Cl.
*G06F 15/16* (2006.01)
*G06F 15/173* (2006.01)

(52) U.S. Cl. ...................... 709/201; 709/217; 709/223; 709/224; 709/226

(58) Field of Classification Search ................ 709/201, 709/217, 223, 224, 226
See application file for complete search history.

(56) References Cited

U.S. PATENT DOCUMENTS

| 5,287,194 | A | * | 2/1994 | Lobiondo | 358/296 |
| 5,371,838 | A | * | 12/1994 | Fujii et al. | 358/1.17 |
| 5,940,186 | A | * | 8/1999 | Barry et al. | 358/296 |
| 6,240,460 | B1 | * | 5/2001 | Mitsutake et al. | 709/235 |
| 6,331,896 | B1 | | 12/2001 | Morita | |
| 6,906,819 | B2 | * | 6/2005 | Katsuda et al. | 358/1.15 |
| 7,274,474 | B2 | | 9/2007 | Yamaguchi et al. | |

(Continued)

FOREIGN PATENT DOCUMENTS

JP 07-099490 4/1995

(Continued)

*Primary Examiner*—Thu Nguyen
*Assistant Examiner*—Angela Widhalm
(74) *Attorney, Agent, or Firm*—Harness, Dickey & Pierce, P.L.C.

(57) ABSTRACT

A network data processing system is provided suitable for achieving reduction of network traffic volume and shortening of the time elapsed before first print out. A client unit generates printing data formed by segmenting data with respect to each component that constitutes printing contents, transmits a printing request including header information to a printer, searches for partial data from inside a storage part in response to an acquisition request, and transmits the retrieved partial data to the printer. When the printing request is received, the printer analyzes the received printing request, determines whether or not the partial data required for forming the printing data is stored in a storage part, acquires insufficient partial data from the client unit having a small hop count, stores the acquired partial data in the storage part, and forms the printing data based on the partial data of the storage part.

41 Claims, 13 Drawing Sheets

U.S. PATENT DOCUMENTS

| | | | |
|---|---|---|---|
| 7,548,331 B2 * | 6/2009 | Ferlitsch ................ | 358/1.15 |
| 2003/0117646 A1 * | 6/2003 | Akiyama et al. .......... | 358/1.15 |
| 2003/0231328 A1 * | 12/2003 | Chapin et al. ............. | 358/1.13 |
| 2004/0190042 A1 * | 9/2004 | Ferlitsch et al. ........... | 358/1.15 |
| 2004/0196497 A1 * | 10/2004 | Klassen et al. ............ | 358/1.15 |
| 2005/0219607 A1 | 10/2005 | Yamaguchi et al. | |
| 2006/0203285 A1 | 9/2006 | Yamaguchi et al. | |

FOREIGN PATENT DOCUMENTS

| | | |
|---|---|---|
| JP | 08-097860 | 4/1996 |
| JP | 08-278862 | 10/1996 |
| JP | 11-031054 | 2/1999 |
| JP | 11-134125 | 5/1999 |
| JP | 11-305974 | 11/1999 |
| JP | 2000-101642 | 4/2000 |
| JP | 2000-207150 | 7/2000 |
| JP | 2001-339426 | 12/2001 |

\* cited by examiner

US 7,774,401 B2

NETWORK DATA PROCESSING SYSTEM, A NETWORK PRINTING SYSTEM, A DATA PROCESSING UNIT, A PRINTER, A DATA PROCESSING PROGRAM AND A PRINTING PROCESSING PROGRAM, AND A NETWORK DATA PROCESSING METHOD AND A NETWORK PRINTING METHOD

RELATED APPLICATIONS

This application claims priority to Japanese Patent Application Nos. 2003-290451 filed Aug. 8, 2003, and 2004-161670 filed May 31, 2004, which are hereby expressly incorporated by reference herein in their entirety.

BACKGROUND

The present invention relates to a system, an apparatus and a program, and a method for performing printing via a network, and specifically, to a network data processing system, a network printing system, a data processing unit, a printer, a data processing program, a printing processing program, a network data processing method and a network printing method suitable for reducing network traffic volume and shortening the time elapsed before first print out.

Conventionally, in many offices of companies and the government, data processing units such as personal computers distributed with respect to each staff member (user) and printers such as color printers and laser printers are connected via a network such as a LAN and sharing is generally adopted, however, by this form, sometimes the traffic volume of the network increases and a long time is taken for the first print out between the time the printing request is made and the time the printing starts due to transfers of vast amounts of printing data and concentrations of printing requests.

Due to this, conventionally, for example, as shown in the Publication of Japanese Patent Application No. Hei-8-278862 and the Publication of Japanese Patent Application No. Hei-11-305974, a method is proposed for reducing network traffic volume and shortening the time elapsed before first print out by providing a storage part within the printer and storing printing data that has been printed in the printer in the storage part, and, when there is the same printing request later, the printing data stored in the storage part is used to perform printing processing.

In the conventional printing processing method, a remarkable effect can be obtained when printed materials have the same contents, however, with respect to a part of data of the printing data, for example, document data relating to formats and layouts of documents and image data and text data combined with the document data, when even a part of the data is different, the entire printing data including the different data part must be transferred, and reducing network traffic volume and shortening the time elapsed before first print out can be obtained only in a small part of the printing processing.

This is not limited to the case where a data processing unit performs printing with a printer via a network, but, for example, the same problem is assumed when plural data processing units share and edit a single piece of data.

Accordingly, the invention focuses attention on the unsolved problems of the conventional technology, and aims to provide a network data processing system, a network printing system, a data processing unit, a printer, a data processing program, a printing processing program, a network data processing method and a network printing method suitable for reducing network traffic volume and shortening the time elapsed before first print out.

SUMMARY

In order to achieve the above described object, a network data processing system of aspect 1 is a system in which plural first data processing units and a second data processing unit are connected to a network, and the system is characterized in that:

the first data processing unit has first data storage means for storing a part of or all processing data formed by segmenting data with respect to each component that constitutes processing contents in units of the segment, storage data searching means for searching for partial data corresponding to the component from inside the first data storage means in response to an acquirement request from the second data processing unit, and partial data transmitting means for transmitting the partial data retrieved by the storage data searching means to the second data processing unit, the second data processing unit has partial data acquisition means for acquiring partial data required for forming the processing data from the first data processing unit and processing data forming means for forming the processing data based on the partial data acquired by the partial data acquisition means, and the partial data acquisition means is arranged so as to acquire the partial data from the first data processing unit having the shortest data transfer time or the first data processing unit estimated to have the shortest data transfer time of the plural first data processing units.

According to such constitution, in the second data processing unit, by the partial data acquisition means, the partial data required for forming the processing data is acquired from the first data processing unit having the shortest data transfer time or the first data processing unit estimated to have the shortest data transfer time among the plural first data processing units.

In the first data processing unit, when the unit receives the acquirement request from the second data processing unit, by the storage data searching means, the partial data is searched for from inside the first data storage means, and, by the partial data transmitting means, the partial data retrieved by the search is transmitted to the second data processing unit.

In the second data processing unit, when the required partial data is acquired, by the processing data forming means, the processing data is formed based on the acquired partial data.

Thereby, when a part of the processing data required for processing in the second processing unit is different, since only the data of the different part is transferred on the network, the network traffic volume can be reduced further and the time elapsed before first print out can be shortened further compared to the conventional case. Further, since the partial data is acquired from the source having the shortest data transfer time of the plural first data processing units, the acquisition of the partial data can be performed relatively faster and the time elapsed before first print out can be shortened further can be obtained.

Here, the first data processing unit having the shortest data transfer time is a concept including, for example, at least a data processing unit having the shortest communication distance or communication time on the network, a data processing unit having a smaller network traffic volume of the communication path, or a data processing unit having a larger data transfer capacity of the communication path. The communication distance, communication time, network traffic volume, and data transfer capacity can be grasped by actual measurement or estimation. In the case of actual measurement, it may be performed at the time of communication, or performed in advance. This is the same as in the following data processing units, data processing programs, and network data processing methods.

Further, the first processing unit may be any of a data processing unit, a printer, or other data processing units, and, similarly, the second processing unit may be any of a data processing unit, a printer, or other data processing units. This is the same as in the following data processing units, data processing programs, and network data processing methods.

Further, the first data storage means is for storing data by any means at any time, and the data may be stored in advance, or without storing data in advance, the means may be arranged so as to store data by input from the outside at the time of the operation of the system or the like. This is the same as in the following network printing systems.

On the other hand, in order to achieve the above described object, a network printing system of aspect 2 is a system in which plural data processing units and a printer are connected to a network, and the system is characterized in that:

the data processing unit has first data storage means for storing a part of or all printing data formed by segmenting data with respect to each component that constitutes printing contents in units of the segment, first storage data registration means for storing the printing data in the first data storage means, first storage data searching means for searching for the partial data from inside the first data storage means in response to an acquirement request from the printer, first partial data transmitting means for transmitting the partial data retrieved by the first storage data searching means to the request source printer, the printer has partial data acquisition means for acquiring partial data required for forming the printing data from the data processing unit, printing data forming means for forming the printing data based on the partial data acquired by the partial data acquisition means, and printing means for performing printing based on the printing data formed by the printing data forming means, and the partial data acquisition means is arranged so as to acquire the partial data from the data processing unit having the shortest data transfer time or the data processing unit estimated to have the shortest data transfer time of the plural data processing units.

According to such constitution, in the data processing unit, by the first storage data registration means, the printing data is stored in the first data storage means.

In the printer, by the partial data acquisition means, the partial data required for forming the printing data is acquired from the data processing unit having the shortest data transfer time or the data processing unit estimated to have the shortest data transfer time of the plural data processing units.

In the data processing unit, when the unit receives the acquirement request from the printer, by the first storage data searching means, the partial data is searched for from inside the first data storage means, and, by the first partial data transmitting means, the partial data retrieved by the search is transmitted to the request source printer.

In the printer, when the required partial data is acquired, by the printing data forming means, the printing data is formed based on the acquired partial data. Then, by the printing means, printing is performed based on the formed printing data.

Thereby, when a part of the printing data required for printing in the printer is different, since only the data of the different part is transferred on the network, the network traffic volume can be reduced further and the time elapsed before first print out can be shortened further compared to the conventional case. Further, since the partial data is acquired from the source having the shortest data transfer time of the plural data processing units, the acquisition of the partial data can be performed relatively faster and the time elapsed before first print out can be shortened further.

Here, the data processing unit having the shortest data transfer time is a concept including, for example, at least a data processing unit having the shortest communication distance or communication time on the network, a data processing unit having a smaller network traffic volume of the communication path, or a data processing unit having a larger data transfer capacity of the communication path. The communication distance, communication time, network traffic volume, and data transfer capacity can be grasped by actual measurement or estimation. In the case of actual measurement, it may be performed at the time of communication, or performed in advance. This is the same as in the following printers, data processing programs, and network printing methods.

Furthermore, a network printing system of aspect 3 is characterized in that, in the network printing system according to aspect 2, the data processing unit further has printing data generating means for generating the printing data and printing request transmitting means for transmitting a printing request including structure information representing the segment structure with respect to the printing data generated by the printing data generating means and identification information for identifying partial data corresponding to each of the components to the printer, the printer further has second data storage means for storing a part of or all the printing data in units of the segment, printing request receiving means for receiving the printing request, data storage determination means for analyzing the printing request received by the printing request receiving means and determining whether or not the partial data required for forming the printing data is stored in the second data storage means, and second storage data registration means for storing the partial data acquired by the partial data acquisition means in the second data storage means, the partial data acquisition means is arranged so as to acquire insufficient partial data for the formation of the printing data based on a determination result of the data storage determination means from the data processing unit, and the printing data forming means is arranged so as to form the printing data based on the partial data acquired by the partial data acquisition means and the partial data of the second data storage means.

According to such constitution, in the data processing unit, when the printing data is generated by the printing data generating means, by the first storage data registration means, the generated printing data is stored in the first data storage means, and, by the printing request transmitting means, a printing request including structure information with respect to the generated printing data and identification information of each partial data is transmitted to the printer.

In the printer, when the printing request is received by the printing request receiving means, by data storage determination means, the received printing request is analyzed and whether or not the partial data required for forming the printing data is stored in the second data storage means is determined, and, by the partial data acquisition means, insufficient partial data for the formation of the printing data is acquired based on the determination result from the source having the shortest data transfer time of the plural data processing units.

In the data processing unit, when the unit receives the acquirement request from the printer, by the first storage data searching means, the partial data is searched for from inside the first data storage means, and, by the first partial data transmitting means, the partial data retrieved by the search is transmitted to the request source printer.

In the printer, when the insufficient partial data is acquired, by the second storage data registration means, the acquired partial data is stored in the second data storage means, and, by the printing data forming means, the printing data is formed based on the acquired partial data and the partial data of the second data storage means. Then, by the printing means, printing is performed based on the formed printing data.

Thereby, when a part of the printing data required for printing in the printer matches the printing data of the second data storage means and the other part is different, since only the data of the different part is transferred on the network, the network traffic volume can be reduced and the time elapsed before first print out can be shortened.

Here, the second data storage means is for storing data by any means at any time, and the data may be stored in advance, or without storing data in advance, the means may be arranged so as to store data by input from the outside at the time of the operation of the system or the like.

Furthermore, a network printing system of aspect 4 is characterized in that, in the network printing system according to aspect 2 or 3, the printer further has hop count information storage means for storing hop count information representing a hop count that indicates, with the plural data processing units as data acquisition sources, respectively, with respect to each of the data acquisition sources, the number of connection stages of a repeater on a communication path with the data acquisition source of interest so as to correspond to the data acquisition source of interest, and the partial data acquisition means is arranged, with respect to each of the data acquisition sources, to read the hop count information corresponding to the data acquisition source of interest from the hop count information storage means, select one having the least hop count from the plural data acquisition sources based on the read hop count information, and acquire the partial data from the selected data acquisition source.

According to such constitution, in the printer, by the partial data acquisition means, with respect to each of the data acquisition sources, the hop count information corresponding to the data acquisition source is read from the hop count information storage means, the one having the least hop count is selected from the plural data acquisition sources based on the read hop count information, and the acquisition request is transmitted to the selected data acquisition source and the partial data is acquired.

Thereby, since the partial data is acquired from the source having the shorter transfer distance of the plural data processing units, the acquisition of the partial data can be performed relatively faster and the time elapsed before first print out can be shortened.

Here, the hop count information storage means is for storing hop count information by any means at any time, and the hop count information may be stored in advance, or without storing the hop count information in advance, the means may be arranged so as to store the hop count information by input from the outside at the time of the operation of the system or the like.

Further, in the hop count information storage means, the hop count may be measured in advance and the measurement result may be stored as the hop count information, or the hop count may be dynamically measured at the time of the operation of the system and the measurement result may be stored as the hop count information.

Furthermore, a network printing system of aspect 5 is characterized in that, in the network printing system according to aspect 2 or 3, the printer further has time for arrival information storage means for storing time for arrival information representing, with the plural data processing units as data acquisition sources, respectively, with respect to each of the data acquisition sources, the time for arrival elapsed before a packet arrives at the data acquisition source of interest so as to correspond to the data acquisition source of interest, the partial data acquisition means is arranged, with respect to each of the data acquisition sources, to read the time for arrival information corresponding to the data acquisition source of interest from the time for arrival information storage means, select the one having the shortest time for arrival from the plural data acquisition sources based on the read time for arrival information, and acquire the partial data from the selected data acquisition source.

According to such constitution, in the printer, by the partial data acquisition means, with respect to each of the data acquisition sources, the time for arrival information corresponding to the data acquisition source is read from the time for arrival information storage means, the one having the shortest time for arrival is selected from the plural data acquisition sources based on the read time for arrival information, and the acquisition request is transmitted to the selected data acquisition source and the partial data is acquired.

Thereby, since the partial data is acquired from the source having the shorter communication time on the network of the plural data processing units, the acquisition of the partial data can be performed relatively faster and the time elapsed before first print out can be shortened.

Here, the time for arrival information storage means is for storing time for arrival information by any means at any time, and the time for arrival information may be stored in advance, or without storing time for arrival information in advance, the means may be arranged so as to store the time for arrival information by input from the outside at the time of the operation of the system or the like.

Further, in the time for arrival information storage means, the time for arrival may be measured in advance and the measurement result may be stored as the time for arrival information, or the time for arrival may be measured dynamically at the time of the operation of the system and the measurement result may be stored as the time for arrival information.

Furthermore, a network printing system of aspect 6 is a system in which plural data processing units and a printer are connected to a network, and the system is characterized in that:

the data processing unit has first data storage means for storing a part of or all printing data formed by segmenting data with respect to each component that constitutes printing contents in units of the segment, first storage data registration means for storing the printing data in the first data storage means, first storage data searching means for searching for the partial data from inside the first data storage means in response to an acquirement request from the printer, and first partial data transmitting means for transmitting the partial data retrieved by the first storage data searching means to the request source printer, the printer has communication cost information storage means for storing communication cost information representing, with the plural data processing units as data acquisition sources, respectively, with respect to each of the data acquisition sources, communication cost required for communication with the data acquisition source of interest so as to correspond to the data acquisition source of interest, and the partial data acquisition means is arranged, with respect to each of the data acquisition sources, to read the communication cost information corresponding to the data acquisition source of interest from the communication cost information storage means, select the one having the lowest communication cost from the plural data acquisition sources based on the read communication cost information, and acquire the partial data from the selected data acquisition source.

According to such constitution, in the printer, by the partial data acquisition means, with respect to each of the data acquisition sources, the communication cost information corresponding to the data acquisition source is read from the communication cost information storage means, the one having the lowest communication cost is selected from the plural data acquisition sources based on the read communication cost information, and the acquisition request is transmitted to the selected data acquisition source and the partial data is acquired.

Thereby, since the partial data is acquired from the source having the lower communication cost of the plural data processing units, the printing cost can be relatively reduced.

Here, the communication cost information storage means is for storing communication cost information by any means at any time, and the communication cost information may be stored in advance, or without storing communication cost information in advance, the means may be arranged so as to store the communication cost information by input from the outside at the time of the operation of the system or the like.

Further, in the communication cost information storage means, the communication cost may be measured in advance and the measurement result may be stored as the communication cost information, or the communication cost may be measured at the time of the operation of the system and the measurement result may be stored as the communication cost information.

Furthermore, a network printing system of aspect 7 is characterized in that, in the network printing system according to any one of aspects 2 to 6, the data processing unit further has first data management means for managing the partial data stored in the first data storage means, the printer further has second data management means for managing the partial data and address information storage means for storing address information, the first storage data registration means is arranged so as to store the partial data in the first data storage means with respect to each partial data that forms the printing data so as to correspond to identification information for identifying the partial data of interest, the second data management means is arranged so as to acquire, with respect to the partial data required for forming the printing data, the identification information for identifying the partial data of interest, broadcast a data presence confirmation request including the acquired identification information, and, when the means receives a data presence response representing the presence of the partial data, register address information of the transmission source of the data presence response of interest in the address information storage means, the first data management means is arranged, when the means receives the data presence confirmation request, to search for the same identification information as the identification information included in the received data presence confirmation request from inside the first data storage means, and, when the identification information of interest is retrieved, transmit the data presence response to the request source printer, and the partial data acquisition means is arranged so as to read the address information corresponding to the acquisition source of the partial data from the address information storage means and acquire the partial data from the data acquisition source based on the read address information.

According to such constitution, in the data processing unit, by the first storage data registration means, the printing data is stored with respect to each partial data that forms the printing data so as to correspond to the identification information for identifying the partial data in the first data storage means.

In the printer, by the second data management means, with respect to the partial data required for forming the printing data, the identification information for identifying the partial data is acquired and a data presence confirmation request including the acquired identification information is broadcasted.

In the data processing unit, when the data presence confirmation request is received, by the first data management means, the same identification information as the identification information included in the received data presence confirmation request is searched for from inside the first data storage means. As a result, when the identification information of interest is retrieved, the data presence response representing the presence of the partial data is transmitted to the request source printer.

In the printer, when the data presence response is received, by the second data management means, address information of the transmission source of the data presence response is registered in the address information storage means. Then, when the partial data required for forming the printing data is acquired, by the partial data acquisition means, the address information corresponding to the acquisition source of partial data is read from the address information storage means, the acquisition request is transmitted to the data acquisition source based on the read address information and the partial data is acquired.

Here, the second data management means is arranged so as to acquire, with respect to the partial data required for forming the printing data, the identification information for identifying the partial data, and, more specifically, since the identification information is included in the printing request, the identification information can be acquired from the printing request received by the printing request receiving means. In other cases, identification information can be generated independently and acquired.

Further, the address information storage means is for storing address information by any means at any time, and the address information may be stored in advance, or without storing address information in advance, the means may be arranged so as to store the address information by input from the outside at the time of the operation of the system or the like. This is the same as in the following network printing system.

Furthermore, a network printing system of aspect 8 is characterized in that, in the network printing system according to any one of aspects 2 to 6, the data processing unit further has first data management means for managing the partial data stored in the first data storage means, the printer further has second data management means for managing the partial data and address information storage means for storing address information, the first storage data registration means is arranged so as to store the partial data in the first data storage means with respect to each partial data that forms the printing data so as to correspond to identification information for identifying the partial data of interest, the first data management means is arranged, with respect to each partial data of the first data storage means, to read the identification information corresponding to the partial data of interest from the first data storage means and broadcast a data presence notification including the read identification information, the second data management means is arranged, when the means receives the data presence notification, to register address information of the transmission source of the data presence notification of interest in the address information storage means so as to correspond to the identification information included in the received data presence notification, and the partial data acquisition means is arranged so as to acquire, with respect to the partial data required for forming the printing data, the identification information for identifying the partial data of interest, read the address information corresponding to the acquired identification information from the address information storage means, and acquire the partial data from the acquisition source of the partial data based on the read address information.

According to such constitution, in the data processing unit, by the first storage data registration means, the printing data is stored with respect to each partial data that forms the printing data so as to correspond to identification information for identifying the partial data in the first data storage means. Further, by the first data management means, with respect to each partial data of the first data storage means, the identification information corresponding to the partial data is read from the first data storage means and a data presence notification including the read identification information is broadcasted.

In the printer, when the data presence notification is received, by the second data management means, address information of the transmission source of the data presence notification is registered in the address information storage means so as to correspond to the identification information included in the received data presence notification. Then, when the partial data required for forming the printing data is acquired, by the partial data acquisition means, with respect to the partial data required for forming the printing data, the identification information for identifying the partial data is acquired, the address information corresponding to the acquired identification information is read from the address information storage means, the acquisition request is transmitted to the partial data acquisition source based on the read address information, and the partial data is acquired.

Here, the partial data acquisition means is arranged so as to acquire, with respect to the partial data required for forming the printing data, the identification information for identifying the partial data, and, more specifically, since the identification information is included in the printing request, the identification information can be acquired from the printing request received by the printing request receiving means. In other cases, identification information can be generated independently and acquired. This is the same as in the following network printing systems.

Furthermore, a network printing system of aspect 9 is characterized in that, in the network printing system according to any one of aspects 2 to 6, the data processing unit further has first data management means for managing the partial data stored in the first data storage means and address information storage means for storing address information, the first data management means is arranged so as to register, with the data processing unit as a data acquisition source, the address information of the data acquisition source in which the partial data is stored in the address information storage means so as to correspond to the identification information for identifying the partial data of interest, when the means receives a data presence confirmation request including the identification information, read the address information corresponding to the identification information included in the received data presence confirmation request from the address information storage means, and transmit a data presence response including read address information to the request source printer, and the partial data acquisition means is arranged so as to acquire, with respect to the partial data required for forming the printing data, the identification information for identifying the partial data of interest, transmit the data presence confirmation request including the acquired identification information to the data processing unit having the first data management means, and, when the means receives the data presence response, acquire the partial data from the data acquisition source based on the address information included in the received data presence response.

According to such constitution, in the data processing unit, by the first data management means, the address information of the data acquisition source in which the partial data is stored is registered in the address information storage means so as to correspond to the identification information for identifying the partial data.

On the other hand, in the printer, by the partial data acquisition means, with respect to the partial data required for forming the printing data, the identification information for identifying the partial data is acquired and the data presence confirmation request including the acquired identification information is transmitted to the data processing unit having the first data management means.

In the data processing unit, when the data presence confirmation request is received, by the first data management means, the address information corresponding to the identification information included in the received data presence confirmation request is read from the address information storage means, and a data presence response including read address information is transmitted to the request source printer.

In the printer, when the data presence response is received, by the partial data acquisition means, the acquisition request is transmitted to the data acquisition source based on the address information included in the received data presence response and the partial data is acquired.

Thereby, since the partial data stored in the data acquisition source is managed in the data processing unit, the printer can acquire the partial data stored in the data acquisition source only by making inquiries to the data processing unit.

Furthermore, a network printing system of aspect 10 is characterized in that, in the network printing system according to aspect 9, the first data management means is arranged so as to acquire, with respect to the partial data stored in the first data storage means, the identification information for identifying the partial data of interest and register the address information of the data processing unit of interest in the address information storage means so as to correspond to the acquired identification information.

According to such constitution, in the data processing unit, by the first data management means, with respect to the partial data stored in the first data storage means, the identification information for identifying the partial data is acquired and its address information is registered in the address information storage means so as to correspond to the acquired identification information.

Thereby, since the partial data stored in the data processing unit is managed by the data processing unit, the printer can acquire the partial data stored in the data processing unit only by making inquiries to the data processing unit.

Here, the first data management means is arranged so as to acquire, with respect to the partial data stored in the first data storage means, the identification information for identifying the partial data, and, more specifically, since the identification information is included in the printing request, the identification information can be acquired from the printing request transmitted by the printing request transmitting means. Further, when the identification information included in the printing request is stored in the first data storage means, the identification information can be acquired from the first data storage means. In other cases, identification information can be generated independently and acquired. This is the same as in the following network printing systems.

Furthermore, a network printing system of aspect 11 is characterized in that, in the network printing system according to any one of aspects 2 to 6, with the data processing unit as a data acquisition source, a data management terminal for managing storage data of the data acquisition source is connected to the network, the data management terminal has data management means for managing the storage data of the data acquisition source and address information storage means for storing address information, the data management means is arranged so as to register the address information of the data acquisition source in which the partial data is stored in the address information storage means so as to correspond to the identification information for identifying the partial data of interest, when the means receives a data presence confirmation request including the identification information, read the address information corresponding to the identification information included in the received data presence confirmation request from the address information storage means, and transmit a data presence response including the read address information to the request source printer, and the partial data acquisition means is arranged so as to acquire, with respect to the partial data required for forming the printing data, the identification information for identifying the partial data of interest, transmit the data presence confirmation request including the acquired identification information to the data management terminal, and, when the means receives the data presence response, acquire the partial data from the data acquisition source based on the address information included in the received data presence response.

According to such constitution, in the data management terminal, by the data management means, the address information of the data acquisition source in which the partial data is stored is registered in the address information storage means so as to correspond to the identification information for identifying the partial data.

On the other hand, in the printer, by the partial data acquisition means, with respect to the partial data required for forming the printing data, the identification information for identifying the partial data is acquired and the data presence confirmation request including the acquired identification information is transmitted to the data management terminal.

In the data management terminal, when the data presence confirmation request is received, by the data management means, the address information corresponding to the identification information included in the received data presence confirmation request is read from the address information storage means, and a data presence response including read address information is transmitted to the request source printer.

In the printer, when the data presence response is received, by the partial data acquisition means, the acquisition request is transmitted to the data acquisition source based on the address information included in the received data presence response and the partial data is acquired.

Thereby, since the partial data stored in the data acquisition source is managed by the data management terminal, the printer can acquire the partial data stored in the data acquisition source only by making inquiries to the data management terminal.

Furthermore, a network printing system of aspect 12 is characterized in that, in the network printing system according to aspect 11, the data processing unit further has first data management means for managing the partial data stored in the first data storage means, the first data management means is arranged so as to acquire, with respect to the partial data stored in the first data storage means, the identification information for identifying the partial data of interest and transmit a data presence notification including the acquired identification information to the data management terminal, and the data management means is arranged, when the means receives the data presence notification, to register address information of the transmission source of the data presence notification of interest in the address information storage means so as to correspond to the identification information included in the received data presence notification.

According to such constitution, in the data processing unit, by the first data management means, with respect to the partial data stored in the first data storage means, the identification information for identifying the partial data is acquired and the data presence notification including the acquired identification information is transmitted to the data management terminal.

In the data management terminal, when the data presence notification is received, by the data management means, the address information of the transmission source of the data presence notification in the address information storage means so as to correspond to the identification information included in the received data presence notification.

Thereby, since the partial data stored in the data processing unit is managed by the data management terminal, the printer can acquire the partial data stored in the data processing unit only by making inquiries to the data management terminal.

On the other hand, in order to achieve the above described object, a data processing unit of aspect 13 is a unit connected to the first data processing unit in the network data processing system according to aspect 1 via the network, and the unit is characterized in that:

the data processing unit has partial data acquisition means for acquiring partial data required for forming processing data formed by segmenting data with respect to each component that constitutes processing contents from the first data processing unit and processing data forming means for forming the processing data based on the partial data acquired by the partial data acquisition means, and the partial data acquisition means is arranged so as to acquire the partial data from the data processing unit having the shortest data transfer time or the data processing unit estimated to have the shortest data transfer time of the plural first data processing units.

According to such constitution, the same operation as the second data processing unit in the network data processing system of aspect 1 can be obtained. Therefore, the same effect as the network data processing system of aspect 1 can be obtained.

On the other hand, in order to achieve the above described object, a printer of aspect 14 is a printer connected to the data processing unit in the network printing system according to aspect 2 via the network, and the printer is characterized in that:

the printer has partial data acquisition means for acquiring partial data required for forming printing data formed by segmenting data with respect to each component that constitutes printing contents from the data processing unit, printing data forming means for forming the printing data based on the partial data acquired by the partial data acquisition means, and printing means for performing printing based on the printing data formed by the printing data forming means, and the partial data acquisition means is arranged so as to acquire the partial data from the data processing unit having the shortest data transfer time or the data processing unit estimated to have the shortest data transfer time of the plural data processing units.

According to such constitution, the same operation as the printer in the network printing system of aspect 2 can be obtained. Therefore, the same effect as the network printing system of aspect 2 can be obtained.

Further, in order to achieve the above described object, a printer of aspect 15 is a printer connected to plural data processing units via a network, and the printer is characterized in that:

the printer includes partial data acquisition means for acquiring partial data required for forming printing data formed by segmenting data with respect to each component that constitutes printing contents from the data processing unit, printing data forming means for forming the printing data based on the partial data acquired by the partial data acquisition means, and printing means for performing printing based on the printing data formed by the printing data forming means, and the partial data acquisition means is arranged so as to acquire the partial data from the data processing unit having the shortest data transfer time or the data processing unit estimated to have the shortest data transfer time of the plural data processing units.

According to such constitution, the same operation as the printer in the network printing system of aspect 2 can be obtained. Therefore, the same effect as the network printing system of is a 2 can be obtained.

Further, a printer of aspect 16 is characterized in that, in the printer according to aspect 15, the printer further has second data storage means for storing a part of or all the printing data in units of the segment, printing request receiving means for receiving the printing request from the data processing unit, data storage determination means for analyzing the printing request received by the printing request receiving means and determining whether or not the partial data required for forming the printing data is stored in the second data storage means, and second storage data registration means for storing the partial data acquired by the partial data acquisition means in the second data storage means, the partial data acquisition means is arranged so as to acquire insufficient partial data for the formation of the printing data based on a determination result of the data storage determination means from the data processing unit, and the printing data forming means is arranged so as to form the printing data based on the partial data acquired by the partial data acquisition means and the partial data of the second data storage means.

According to such constitution, the same operation as the printer in the network printing system of aspect 3 can be obtained. Therefore, the same effect as the network printing system of aspect 3 can be obtained.

Further, a printer of aspect 17 is characterized in that, in the printer according to aspect 15 or 16, the printer further has hop count information storage means for storing hop count information representing a hop count that indicates, with the plural data processing units as data acquisition sources, respectively, with respect to each of the data acquisition sources, the number of connection stages of a repeater on a communication path with the data acquisition source of interest so as to correspond to the data acquisition source of interest, and the partial data acquisition means is arranged, with respect to each of the data acquisition sources, to read the hop count information corresponding to the data acquisition source of interest from the hop count information storage means, select the one having the least hop count from the plural data acquisition sources based on the read hop count information, and acquire the partial data from the selected data acquisition source.

According to such constitution, the same operation as the printer in the network printing system of aspect 4 can be obtained. Therefore, the same effect as the network printing system of aspect 4 can be obtained.

Further, a printer of aspect 18 is characterized in that, in the printer according to aspect 15 or 16, the printer further has time for arrival information storage means for storing time for arrival information representing, with the plural data processing units as data acquisition sources, respectively, with respect to each of the data acquisition sources, the time for arrival elapsed before a packet arrives at the data acquisition source of interest so as to correspond to the data acquisition source of interest, and the partial data acquisition means is arranged, with respect to each of the data acquisition sources, to read the time for arrival information corresponding to the data acquisition source of interest from the time for arrival information storage means, select the one having the shortest time for arrival from the plural data acquisition sources based on the read time for arrival information, and acquire the partial data from the selected data acquisition source.

According to such constitution, the same operation as the printer in the network printing system of aspect 5 can be obtained. Therefore, the same effect as the network printing system of aspect 5 can be obtained.

Further, a printer of aspect 19 is characterized in that, in the printer according to aspect 15 or 16, the printer further has communication cost information storage means for storing communication cost information representing, with the plural data processing units as data acquisition sources, respectively, with respect to each of the data acquisition sources, communication cost required for communication with the data acquisition source of interest so as to correspond to the data acquisition source of interest, and the partial data acquisition means is arranged, with respect to each of the data acquisition sources, to read the communication cost information corresponding to the data acquisition source of interest from the communication cost information storage means, select the one having the lowest communication cost from the plural data acquisition sources based on the read communication cost information, and acquire the partial data from the selected data acquisition source.

According to such constitution, the same operation as the printer in the network printing system of aspect 6 can be obtained. Therefore, the same effect as the network printing system of aspect 6 can be obtained.

Further, a printer of aspect 20 is characterized in that, in the printer according to any one of aspects 15 to 19, the printer further has second data management means for managing the partial data and address information storage means for storing address information, the second data management means is arranged so as to acquire, with the partial data required for forming the printing data, the identification information for identifying the partial data of interest, broadcast a data presence confirmation request including the acquired identification information, and, when the means receives a data presence response representing the presence of the partial data, register address information of the transmission source of the data presence response of interest in the address information storage means, and the partial data acquisition means is arranged so as to read the address information corresponding to the acquisition source of the partial data from the address information storage means and acquire the partial data from the data acquisition source based on the read address information.

According to such constitution, the same operation as the printer in the network printing system of aspect 7 can be obtained. Therefore, the same effect as the network printing system of aspect 7 can be obtained.

Further, a printer of aspect 21 is characterized in that, in the printer according to any one of aspects 15 to 19, the printer further has second data management means for managing the partial data and address information storage means for storing address information, the second data management means is arranged, when the means receives a data presence notification from the data processing unit, to register the address information of the transmission source of the data presence notification of interest in the address information storage means so as to correspond to the identification information included in the received data presence notification, and the partial data acquisition means is arranged so as to acquire, with respect to the partial data required for forming the printing data, the identification information for identifying the partial data of interest, read the address information corresponding to the acquired identification information from the address information storage means, and acquire the partial data from the acquisition source of the partial data based on the read address information.

According to such constitution, the same operation as the printer in the network printing system of aspect 8 can be obtained. Therefore, the same effect to the network printing system of aspect 8 can be obtained.

Further, a printer of aspect 22 is characterized in that, in the printer according to any one of aspects 15 to 19, the partial data acquisition means is arranged so as to acquire, with respect to the partial data required for forming the printing data, the identification information for identifying the partial data of interest, transmit a data presence confirmation request including the acquired identification information to the data processing unit, and, when the means receives a data presence response, acquire the partial data from the data acquisition source based on the address information included in the received data presence response.

According to such constitution, the same operation as the printer in the network printing system of aspect 9 can be obtained. Therefore, the same effect to the network printing system of aspect 9 can be obtained.

Further, a printer of aspect 23 is characterized in that, in the printer according to any one of aspects 15 to 19, the partial data acquisition means is arranged so as to acquire, with respect to the partial data required for forming the printing data, the identification information for identifying the partial data of interest, transmit a data presence confirmation request including the acquired identification information, when a data management terminal is connected, to the data management terminal of interest, and, when the means receives the data presence response, acquire the partial data from the data acquisition source based on the address information included in the received data presence response.

According to such constitution, the same operation as the printer in the network printing system of aspect 11 can be obtained. Therefore, the same effect to the network printing system of aspect 11 can be obtained.

On the other hand, in order to achieve the above described object, a data processing program of aspect 24 is a program for performing data processing by performing communication with the first data processing unit in the network data processing system according to aspect 1 via the network, and the program is characterized in that:

the program causes a computer to execute the processing realized as partial data acquisition means for acquiring partial data required for forming processing data formed by segmenting data with respect to each component that constitutes processing contents from the first data processing unit and processing data forming means for forming the processing data based on the partial data acquired by the partial data acquisition means, and the partial data acquisition means is arranged so as to acquire the partial data from the data processing unit having the shortest data transfer time or the data processing unit estimated to have the shortest data transfer time of the plural first data processing units.

According to such constitution, when the program is read by the computer and the computer executes the processing according to the read program, the same operation and effect as the data processing unit of aspect 13 can be obtained.

On the other hand, in order to achieve the above described object, a printing processing program of aspect 25 is a program for performing printing processing by performing communication with the data processing unit in the network printing system according to aspect 2 via the network, and the program is characterized in that:

the program causes a computer to execute the processing realized as partial data acquisition means for acquiring partial data required for forming printing data formed by segmenting data with respect to each component that constitutes printing contents from the data processing unit, printing data forming means for forming the printing data based on the partial data acquired by the partial data acquisition means, and printing means for performing printing based on the printing data formed by the printing data forming means, and the partial data acquisition means is arranged so as to acquire the partial data from the data processing unit having the shortest data transfer time or the data processing unit estimated to have the shortest data transfer time of the plural data processing units.

According to such constitution, when the program is read by the computer and the computer executes the processing according to the read program, the same operation and effect as the printer of aspect 14 can be obtained.

Further, a printing processing program of aspect 26 is a program for performing printing processing by performing communication with plural data processing units via a network, and the program is characterized in that:

the program causes a computer to execute the processing realized as partial data acquisition means for acquiring partial data required for forming printing data formed by segmenting data with respect to each component that constitutes printing contents from the data processing unit, printing data forming means for forming the printing data based on the partial data acquired by the partial data acquisition means, and printing means for performing printing based on the printing data formed by the printing data forming means, and the partial data acquisition means is arranged so as to acquire the partial data from the data processing unit having the shortest data transfer time or the data processing unit estimated to have the shortest data transfer time of the plural data processing units.

According to such constitution, when the program is read by the computer and the computer executes the processing according to the read program, the same operation and effect as the printer of aspect 15 can be obtained.

Further, a printing processing program of aspect 27 is characterized in that, in the printing processing program according to aspect 26, the program causes the computer to further execute the processing realized as second data storage means for storing a part of or all the printing data in units of the segment, printing request receiving means for receiving a printing request from the data processing unit, data storage determination means for analyzing the printing request received by the printing request receiving means and determining whether or not the partial data required for forming the printing data is stored in the second data storage means, and second storage data registration means for storing the partial data acquired by the partial data acquisition means in the second data storage means, and the partial data acquisition means is arranged so as to acquire insufficient partial data for the formation of the printing data based on a determination result of the data storage determination means from the data processing unit, and the printing data forming means is arranged so as to form the printing data based on the partial data acquired by the partial data acquisition means and the partial data of the second data storage means.

According to such constitution, when the program is read by the computer and the computer executes the processing according to the read program, the same operation and effect as the printer of aspect 16 can be obtained.

Further, a printing processing program of aspect 28 is characterized in that, in the printing processing program according to aspect 26 or 27, the program causes the computer to further execute the processing realized as hop count information storage means for storing hop count information representing a hop count that indicates, with the plural data processing units as data acquisition sources, respectively, with respect to each of the data acquisition sources, the number of connection stages of a repeater on a communication path with the data acquisition source of interest so as to correspond to the data acquisition source of interest, and the partial data acquisition means is arranged, with respect to each of the data acquisition sources, to read the hop count information corresponding to the data acquisition source of interest from the hop count information storage means, select the one having the least hop count from the plural data acquisition sources based on the read hop count information, and acquire the partial data from the selected data acquisition source.

According to such constitution, when the program is read by the computer and the computer executes the processing according to the read program, the same operation and effect as the printer of aspect 17 can be obtained.

Further, a printing processing program of aspect 29 is characterized in that, in the printing processing program according to aspect 26 or 27, the program causes the computer to further execute the processing realized as time for arrival information storage means for storing time for arrival information representing, with the plural data processing units as data acquisition sources, respectively, with respect to each data acquisition source, the time for arrival elapsed before a packet arrives at the data acquisition source of interest so as to correspond to the data acquisition source of interest, and the partial data acquisition means is arranged, with respect to each of the data acquisition sources, to read the time for arrival information corresponding to the data acquisition source of interest from the time for arrival information storage means, select the one having the shortest time for arrival from the plural data acquisition sources based on the read time for arrival information, and acquire the partial data from the selected data acquisition source.

According to such constitution, when the program is read by the computer and the computer executes the processing according to the read program, the same operation and effect as the printer of aspect 18 can be obtained.

Further, a printing processing program of aspect 30 is characterized in that, in the printing processing program according to aspect 26 or 27, the program causes the computer to further execute the processing realized as communication cost information storage means for storing communication cost information representing, with the plural data processing units as data acquisition sources, respectively, with respect to each of the data acquisition sources, communication cost required for communication with the data acquisition source of interest so as to correspond to the data acquisition source of interest, and the partial data acquisition means is arranged, with respect to each of the data acquisition sources, to read the communication cost information corresponding to the data acquisition source of interest from the communication cost information storage means, select the one having the lowest communication cost from the plural data acquisition sources based on the read communication cost information, and acquire the partial data from the selected data acquisition source.

According to such constitution, when the program is read by the computer and the computer executes the processing according to the read program, the same operation and effect as the printer of aspect 19 can be obtained.

Further, a printing processing program of aspect 31 is characterized in that, in the printing processing program according to any one of aspects 26 to 30, the program causes the computer to further execute the processing realized as second data management means for managing the partial data and address information storage means for storing address information, the second data management means is arranged so as to acquire, with respect to the partial data required for forming the printing data, the identification information for identifying the partial data of interest, broadcast a data presence confirmation request including the acquired identification information, and, when the means receives a data presence response representing the presence of the partial data, register address information of the transmission source of the data presence response of interest in the address information storage means, and the partial data acquisition means is arranged so as to read the address information corresponding to the acquisition source of the partial data from the address information storage means and acquire the partial data from the data acquisition source based on the read address information.

According to such constitution, when the program is read by the computer and the computer executes the processing according to the read program, the same operation and effect as the printer of aspect 20 can be obtained.

Further, a printing processing program of aspect 32 is characterized in that, in the printing processing program according to any one of aspects 26 to 30, the program causes the computer to further execute the processing realized as second data management means for managing the partial data and address information storage means for storing address information, the second data management means is arranged, when the means receives a data presence notification from the data processing unit, to register the address information of the transmission source of the data presence notification of interest in the address information storage means so as to correspond to the identification information included in the received data presence notification, and the partial data acquisition means is arranged so as to acquire, with respect to the partial data required for forming the printing data, the identification information for identifying the partial data of interest, read the address information corresponding to the acquired identification information from the address information storage means, and acquire the partial data from the acquisition source of the partial data based on the read address information.

According to such constitution, when the program is read by the computer and the computer executes the processing according to the read program, the same operation and effect as the printer of aspect 21 can be obtained.

Further, a printing processing program of aspect 33 is characterized in that, in the printing processing program according to any one of aspects 26 to 30, the partial data acquisition means is arranged so as to acquire, with respect to the partial data required for forming the printing data, the identification information for identifying the partial data of interest, transmit a data presence confirmation request including the acquired identification information to the data processing unit, and, when the means receives a data presence response, acquire the partial data from the data acquisition source based on the address information included in the received data presence response.

According to such constitution, when the program is read by the computer and the computer executes the processing according to the read program, the same operation and effect as the printer of aspect 22 can be obtained.

Further, a printing processing program of aspect 34 is characterized in that, in the printing processing program according to any one of aspects 26 to 30, the partial data acquisition means is arranged so as to acquire, with respect to the partial data required for forming the printing data, the identification information for identifying the partial data of interest, transmit a data presence confirmation request including the acquired identification information, when a data management terminal is connected, to the data management terminal of interest, and, when the means receives the data presence response, acquire the partial data from the data acquisition source based on the address information included in the received data presence response.

According to such constitution, when the program is read by the computer and the computer executes the processing according to the read program, the same operation and effect as the printer of aspect 23 can be obtained.

On the other hand, in order to achieve the above described object, a network data processing method of aspect 35 is a method for connecting plural first data processing units and a second data processing unit to a network and performing data processing by communication between the first data processing units and the second data processing unit, and the method is characterized by comprising for the second data processing unit, a partial data acquisition step for acquiring partial data required for forming processing data formed by segmenting data with respect to each component that constitutes processing contents from the first data processing unit having the shortest data transfer time or the first data processing unit estimated to have the shortest data transfer time of the plural first data processing units, for the first data processing unit:

a storage data searching step for searching for the partial data from inside first storage means in response to an acquirement request from the second data processing unit, and a partial data transmitting step for transmitting the partial data retrieved in the storage data searching step to the second data processing unit, and further for the second data processing unit, a processing data forming step for forming the processing data based on the partial data acquired in the partial data acquisition step.

Thereby, the same effect as the network data processing system of aspect 1 can be obtained.

On the other hand, in order to achieve the above described object, a network printing method of aspect 36 is a method for connecting plural data processing units and a printer to a network and performing printing processing by communication between the data processing units and the printer, and the method comprising for the data processing unit, a first storage data registration step for storing printing data formed by segmenting data with respect to each component that constitutes printing contents in first data storage means, for the printer, a partial data acquisition step for acquiring partial data required for forming the printing data from the data processing unit having the shortest data transfer time or the data processing unit estimated to have the shortest data transfer time of the plural data processing units, further for the data processing unit:

a first storage data searching step for searching for the partial data from inside the first storage means in response to an acquirement request from the printer, and a first partial data transmitting step for transmitting the partial data retrieved in the first storage data searching step to the request source printer, and further for the printer:

a printing data forming step for forming the printing data based on the partial data acquired in the partial data acquisition step, and a printing step for performing printing based on the printing data formed in the printing data forming step.

Thereby, the same effect as the network printing system of aspect 2 can be obtained.

Further, a network printing method of aspect 37 is characterized in that, in the network printing method according to aspect 36, further for the data processing unit, a printing data generating step for generating the printing data and a printing request transmitting step for transmitting a printing request including structure information representing the segment structure with respect to the printing data generated by the printing data generating means and identification information for identifying partial data corresponding to each component to the printer, further for the printer:

a second data storage step for storing a part of or all the printing data in units of the segment, a printing request receiving step for receiving the printing request, a data storage determination step for analyzing the printing request received in the printing request receiving step and determining whether or not the partial data required for forming the printing data is stored in the second data storage step, and a second storage data registration step for storing the partial data acquired in the partial data acquisition step in the second data storage step, the partial data acquisition step is arranged so as to acquire insufficient partial data for the formation of the printing data based on a determination result of the data storage determination step from the data processing unit, and the printing data forming step is arranged so as to form the printing data based on the partial data acquired in the partial data acquisition step and the partial data of the second data storage step.

Thereby, the same effect as the network printing system of aspect 3 can be obtained.

Further, a network printing method of aspect 38 is characterized in that, in the network printing method according to aspect 36 or 37, for the printer, further comprising a hop count information storage step for storing hop count information representing a hop count that indicates, with the plural data processing units as data acquisition sources, respectively, with respect to each of the data acquisition sources, the number of connection stages of a repeater on a communication path with the data acquisition source of interest so as to correspond to the data acquisition source of interest, and the partial data acquisition step is arranged, with respect to each of the data acquisition sources, to read the hop count information corresponding to the data acquisition source of interest from the hop count information storage means, select the one having the least hop count from the plural data acquisition sources based on the read hop count information, and acquire the partial data from the selected data acquisition source.

Thereby, the same effect as the network printing system of aspect 4 can be obtained.

A network printing method of aspect 39 is characterized in that, in the network printing method according to aspect 36 or 37, for the printer, further comprising a time for arrival information storage step for storing time for arrival information representing, with the plural data processing units as data acquisition sources, respectively, with respect to each of the data acquisition sources, the time for arrival elapsed before a packet arrives at the data acquisition source of interest so as to correspond to the data acquisition source of interest, the partial data acquisition step is arranged, with respect to each of the data acquisition sources, to read the time for arrival information corresponding to the data acquisition source of interest from the time for arrival information storage step, select the one having the shortest time for arrival from the plural data acquisition sources based on the read time for arrival information, and acquire the partial data from the selected data acquisition source.

Thereby, the same effect as the network printing system of aspect 5 can be obtained.

A network printing method of aspect 40 is characterized in that, in the network printing method according to aspect 36 or 37, for the printer, further comprising a communication cost information storage step for storing communication cost information representing, with the plural data processing units as data acquisition sources, respectively, with respect to each of the data acquisition sources, communication cost required for communication with the data acquisition source of interest so as to correspond to the data acquisition source of interest, and the partial data acquisition step is arranged, with respect to each of the data acquisition sources, to read the communication cost information corresponding to the data acquisition source of interest from the communication cost information storage means, select the one having the lowest communication cost from the plural data acquisition sources based on the read communication cost information, and acquire the partial data from the selected data acquisition source.

Thereby, the same effect as the network printing system of aspect 6 can be obtained.

Further, a network printing method of aspect 41 is characterized in that, in the network printing method according to any one of aspects 36 to 40, for the data processing unit, further comprising a first data management step for managing the partial data stored in the first data storage means, for the printer, further comprising, a second data management step for managing the partial data and an address information storage step for storing address information, the first storage data registration step is arranged so as to store the partial data in the first data storage step with respect to each partial data that forms the printing data so as to correspond to identification information for identifying the partial data of interest, the second data management step is arranged so as to acquire, with respect to the partial data required for forming the printing data, the identification information for identifying the partial data of interest, broadcast a data presence confirmation request including the acquired identification information, and, when the step receives a data presence response representing the presence of the partial data, register address information of the transmission source of the data presence response of interest in the address information storage step, the first data management step is arranged, when the data presence confirmation request is received, to search for the same identification information as the identification information included in the received data presence confirmation request from inside the first data storage means, and, when the identification information of interest is retrieved, transmit the data presence response to the request source printer, and the partial data acquisition step is arranged so as to read the address information corresponding to the acquisition source of the partial data from the address information storage step and acquire the partial data from the data acquisition source based on the read address information.

Thereby, the same effect as the network printing system of aspect 7 can be obtained.

Further, a network printing method of aspect 42 is characterized in that, in the network printing method according to any one of aspects 36 to 40, for the data processing unit, further comprising a first data management step for managing the partial data stored in the first data storage step, for the printer, further having a second data management step for managing the partial data and an address information storage step for storing address information, the first storage data registration step is arranged so as to store the partial data in the first data storage step with respect to each partial data that forms the printing data so as to correspond to identification information for identifying the partial data of interest, the first data management step is arranged, with respect to each partial data of the first data storage step, to read the identification information corresponding to the partial data of interest from the first data storage step and broadcast a data presence notification including the read identification information, the second data management step is arranged, when the data presence notification is received, to register address information of the transmission source of the data presence notification of interest in the address information storage step so as to correspond to the identification information included in the received data presence notification, and the partial data acquisition step is arranged so as to acquire, with respect to the partial data required for forming the printing data, the identification information for identifying the partial data of interest, read the address information corresponding to the acquired identification information from the address information storage step, and acquire the partial data from the acquisition source of the partial data based on the read address information.

Thereby, the same effect as the network printing system of aspect 8 can be obtained.

Further, a network printing method of aspect 43 is characterized in that, in the network printing method according to any one of aspects 36 to 40, further for the data processing unit:

a first data management step for managing the partial data stored in the first data storage step and an address information storage step for storing address information, the first data management step is arranged so as to register, with the data processing unit as a data acquisition source, the address information of the data acquisition source in which the partial data is stored in the address information storage step so as to correspond to the identification information for identifying the partial data of interest, when a data presence confirmation request including the identification information is received, read the address information corresponding to the identification information included in the received data presence confirmation request in the address information storage step, and transmit a data presence response including read address information to the request source printer, and the partial data acquisition step is arranged so as to acquire, with respect to the partial data required for forming the printing data, the identification information for identifying the partial data of interest, transmit the data presence confirmation request including the acquired identification information to the data processing unit having the first data management step, and, when the data presence response is received, acquire the partial data from the data acquisition source based on the address information included in the received data presence response.

Thereby, the same effect as the network printing system of aspect 9 can be obtained.

Further, a network printing method of aspect 44 is characterized in that, in the network printing method according to aspect 43, the first data management step is arranged so as to acquire, with respect to the partial data stored in the first data storage step, the identification information for identifying the partial data of interest and register the address information of the data processing unit of interest in the address information storage step so as to correspond to the acquired identification information.

Thereby, the same effect as the network printing system of aspect 10 can be obtained.

Further, a network printing method of aspect 45 is characterized in that, in the network printing method according to any one of aspects 36 to 40, with the data processing unit as a data acquisition source, a data management terminal for managing storage data of the data acquisition source is connected to the network, for the data management terminal, comprising a data management step for managing the storage data of the data acquisition source and an address information storage step for storing address information, the data management step is arranged so as to register the address information of the data acquisition source in which the partial data is stored in the address information storage step so as to correspond to the identification information for identifying the partial data of interest, when a data presence confirmation request including the identification information is received, read the address information corresponding to the identification information included in the received data presence confirmation request in the address information storage step, and transmit a data presence response including the read address information to the request source printer, and the partial data acquisition step is arranged so as to acquire, with respect to the partial data required for forming the printing data, the identification information for identifying the partial data of interest, transmit the data presence confirmation request including the acquired identification information to the data management terminal, and, when the data presence response is received, acquire the partial data from the data acquisition source based on the address information included in the received data presence response.

Thereby, the same effect as the network printing system of aspect 11 can be obtained.

Further, a network printing method of aspect 46 is characterized in that, in the network printing method according to aspect 45, further for the data processing unit:

a first data management step for managing the partial data stored in the first data storage means, the first data management step is arranged so as to acquire, with respect to the partial data stored in the first data storage step, the identification information for identifying the partial data of interest and transmit a data presence notification including the acquired identification information to the data management terminal, and the data management step is arranged, when the data presence notification is received, to register address information of the transmission source of the data presence notification of interest in the address information storage step so as to correspond to the identification information included in the received data presence notification.

Thereby, the same effect as the network printing system of aspect 12 can be obtained.

DETAILED DESCRIPTION

Figure 1:
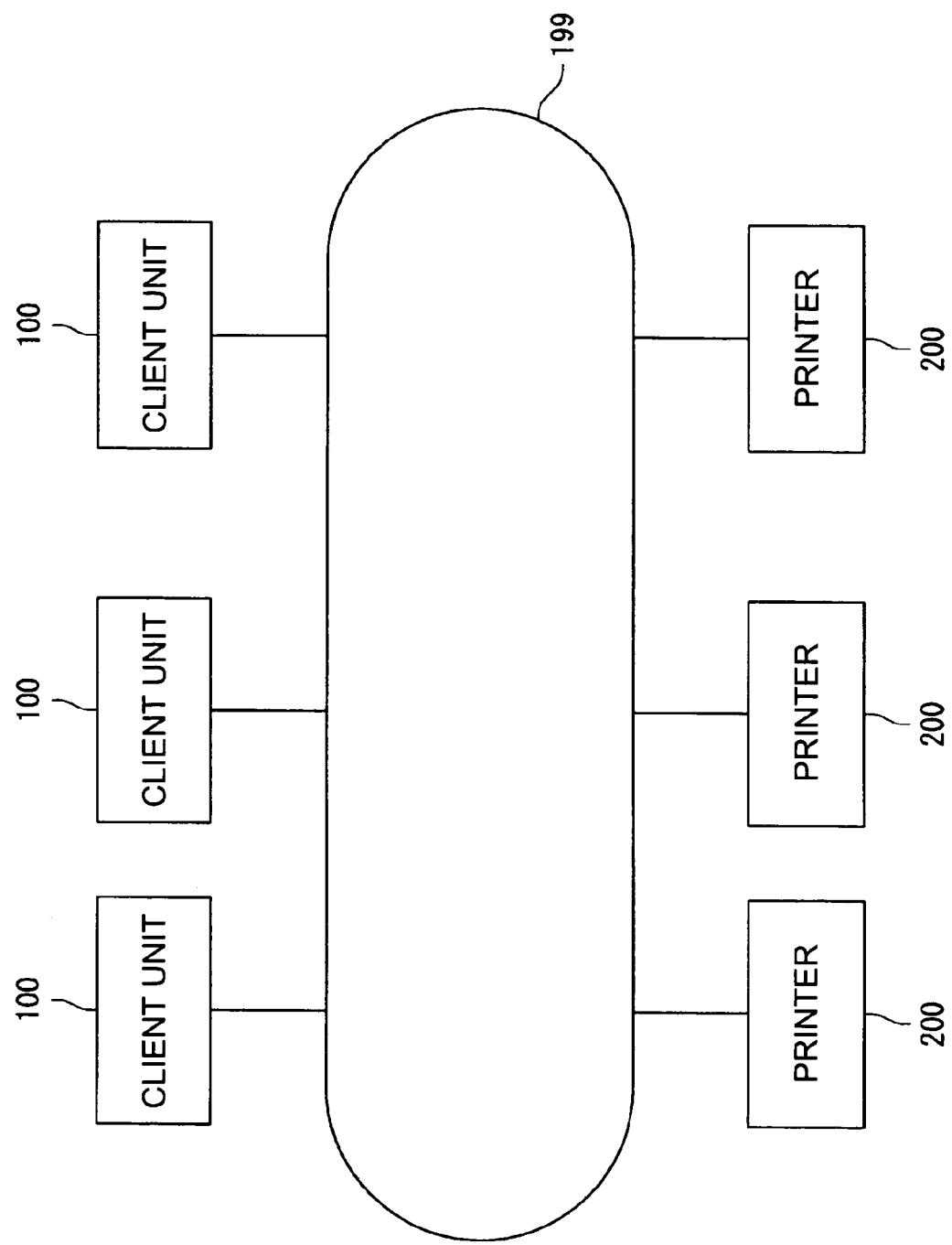
FIG. 1 is a block diagram showing the configuration of the network system to which the invention is applied.

An embodiment of the invention will be described by referring to the drawings.

FIGS. 1 to 14 show an embodiment of a network data processing system, a network printing system, a data processing unit, a printer, a data processing program, a printing processing program and a network data processing method and a network printing method according to the invention.

The embodiment applies the network data processing system, the network printing system, the data processing unit, the printer, the data processing program, the printing processing program and a network data processing method and a network printing method according to the invention to the case where printing is performed in a printer 200 in response to a printing request from a data processing unit (client unit 100), as shown in FIG. 1.

First, a configuration of the network system to which the invention is applied will be described by referring to FIG. 1.

FIG. 1 is a block diagram showing the configuration of the network system to which the invention is applied.

As shown in FIG. 1, a client unit 100 as one of data processing units provided for use of users, and a printer 200 for performing printing in response to a printing request from the client unit 100 are connected to the Internet 199. Note that the client unit 100 is intercommunicably connected to a server, which is not shown.

Next, the constitution of the client unit 100 will be described in detail by referring to FIG. 2.

Figure 2:
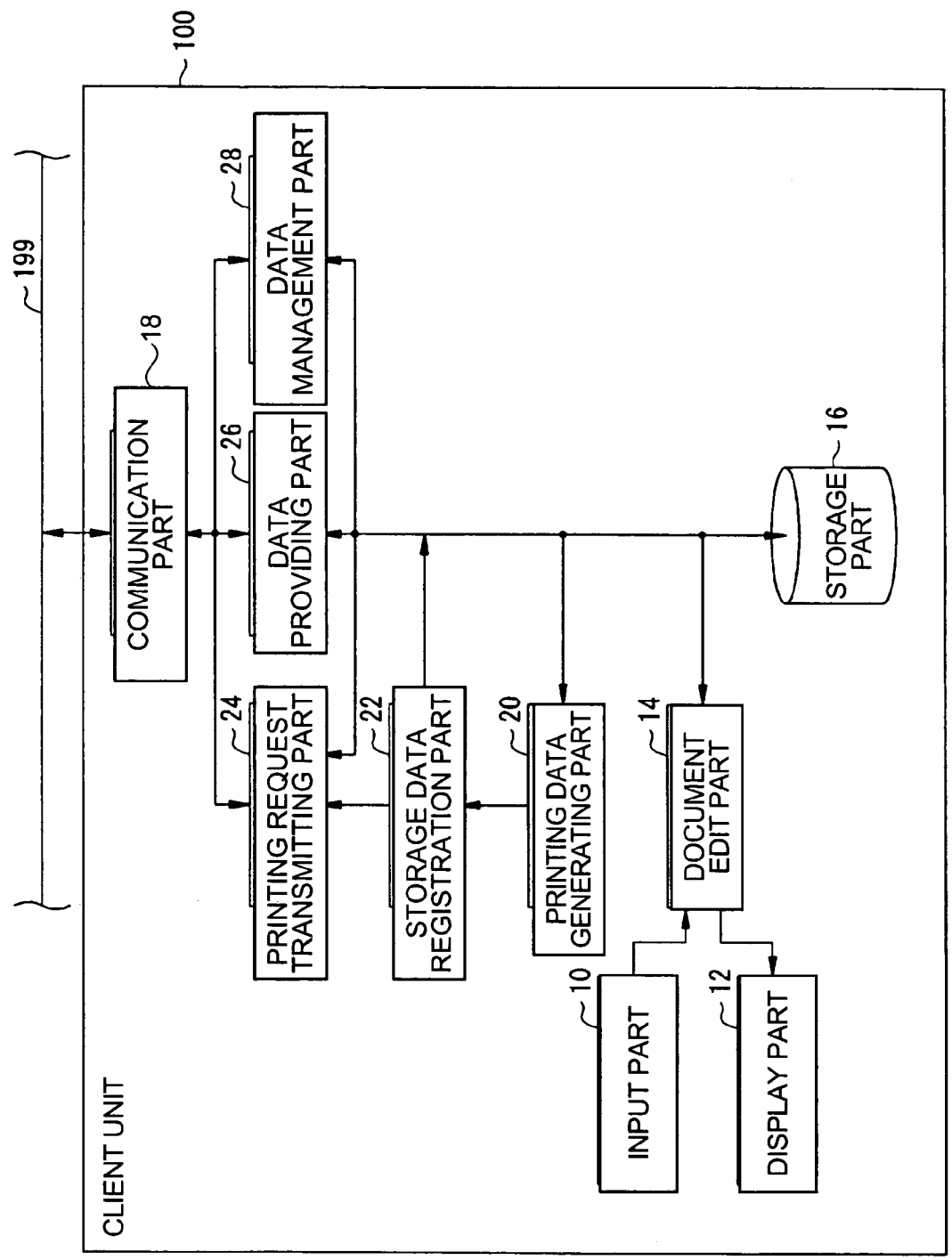
FIG. 2 is a functional block diagram showing the constitution of the client unit 100.

FIG. 2 is a functional block diagram showing the constitution of the client unit 100.

The client unit 100 is constituted by having an input part 10 including a keyboard, mouse, etc., a display part 12 in the form of a CRT (Cathode Ray Tube), LCD (Liquid Crystal Display), or the like, a document edit part 14 for creating and editing a document, and a storage part 16 including a hard disk etc., as shown in FIG. 2. The user creates and edits an arbitrary document using the input part 10, the display part 12, and the document edit part 14. The document created and edited in the document edit part 14 is stored in the storage part 16 as document data, as shown in FIG. 2.

The client unit 100 is constituted by further having a communication part 18 as a communication interface connected to the Internet 199 to perform communication, a printing data generating part 20 for generating printing data based on the document data of the storage part 16, a storage data registration part 22 for storing the printing data generated by the printing data generating part 20 in the storage part 16, and a printing request transmitting part 24 for transmitting a printing request to the printer 200.

The printing data generating part 20 generates printing data constituted by segmenting data with respect to each component that constitutes printing contents based on the data relating to the printing request of the user of the document data of the storage part 16.

Figure 3:
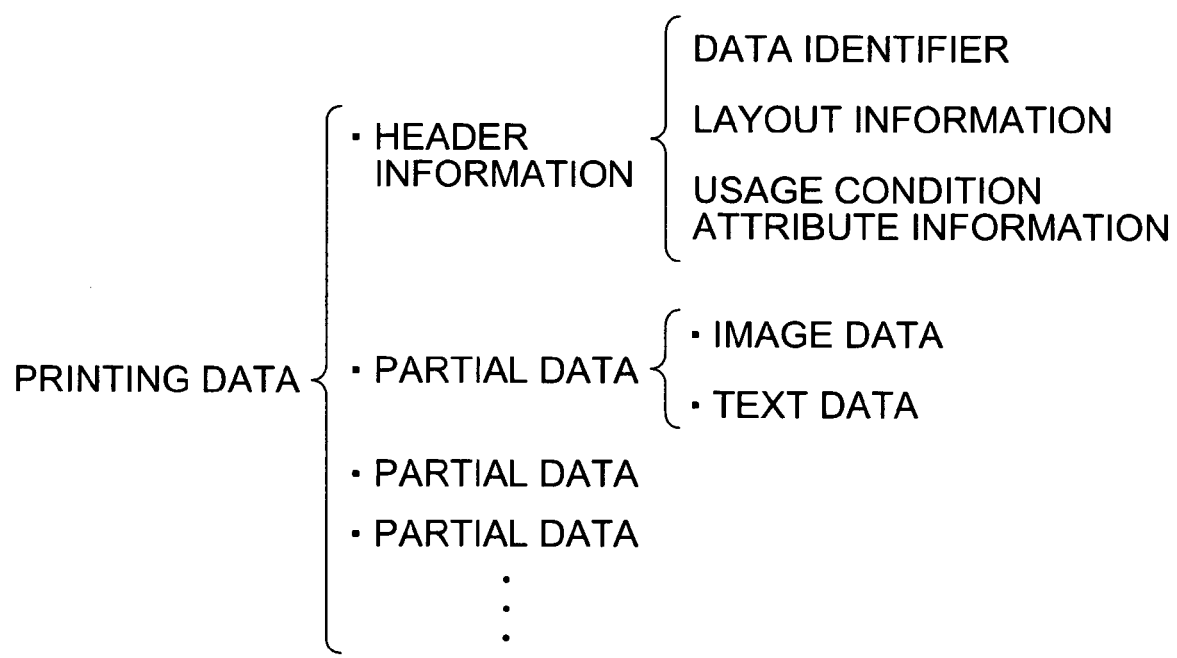
FIG. 3 is a view showing a hierarchical structure of printing data.

FIG. 3 shows a hierarchical structure of printing data.

Figure 4:
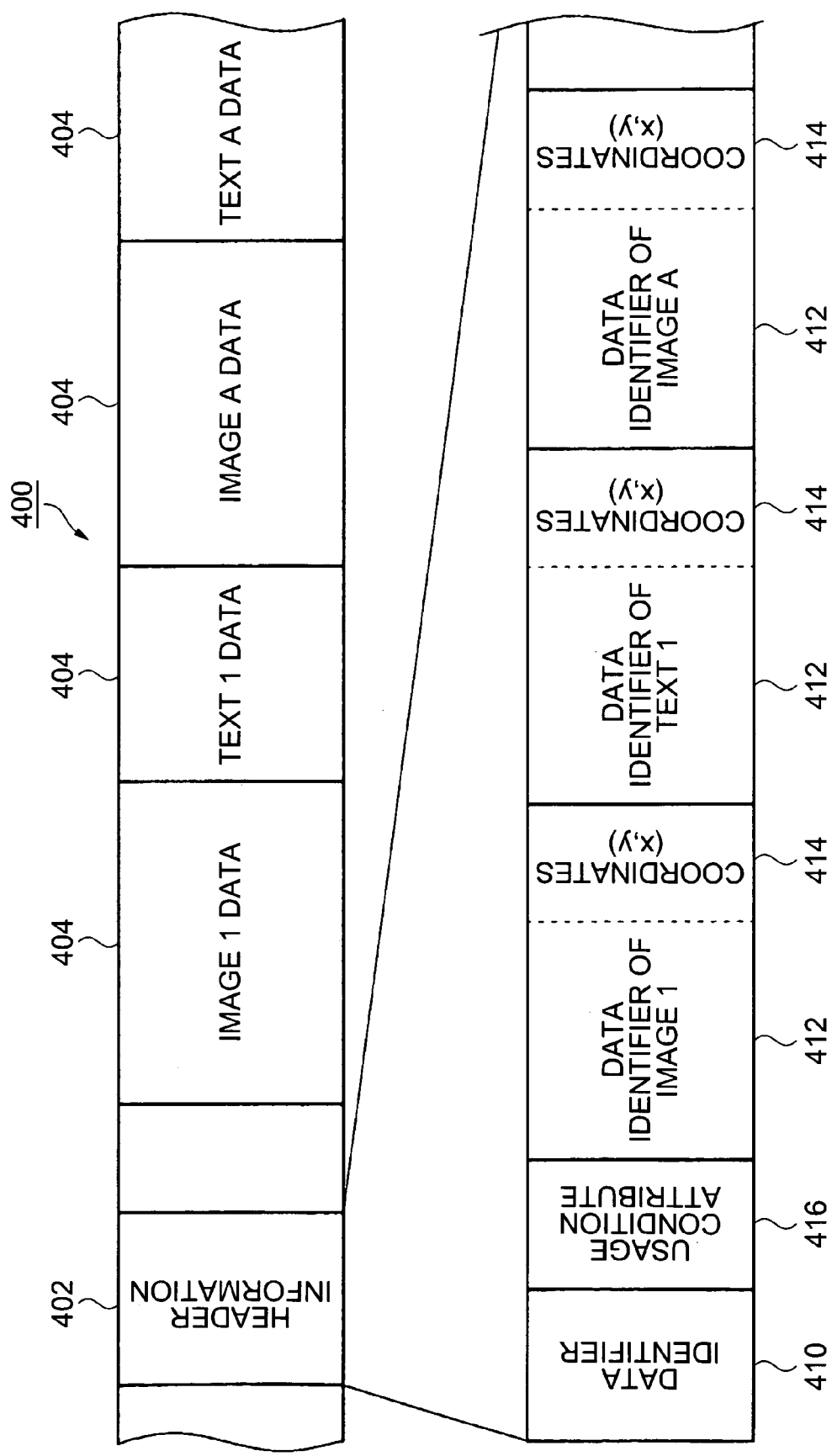
FIG. 4 is a view showing a data structure of printing data.

FIG. 4 shows a data structure of printing data.

Printing data 400 is constituted by header information 402 and one or more pieces of partial data 404 as shown in FIGS. 3 and 4.

The partial data 404 is data corresponding to one of the components (image and text) that constitute the printing contents, and constituted as image data or text data.

The header information 402 is constituted by a data identifier 410 for identifying the printing data 400, a data identifier 412 for identifying the partial data 404 with respect to each partial data 404, layout information 414 representing a layout structure of the printing data 400, and usage condition attribute information 416 representing a usage condition attribute. The usage condition attribute information 416 represents the number of times of use, the ratio of use, the frequency of use, etc. with respect to printing data 400 and each partial data 404.

Figure 5:
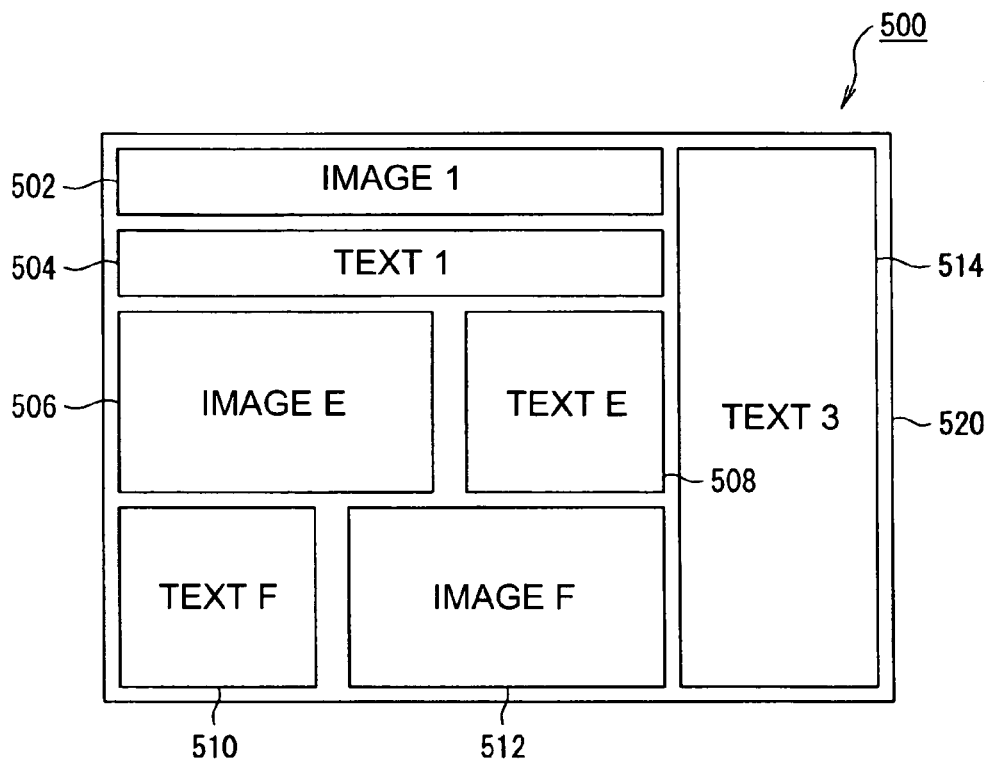
FIG. 5 is a view showing a data structure of document data 500.

FIG. 5 shows a data structure of document data 500.

The document data 500 is constituted by arranging image data 502 representing an image 1, text data 504 representing a text 1, image data 506 representing an image E, text data 508 representing a text E, text data 510 representing a text F, image data 512 representing an image F, and text data 514 representing a text 3 in a layout area 520, as shown in FIG. 5. Here, the text 1 is disposed under the image 1, the image E and the text E are disposed under the text 1, the text F and the image F are disposed under the image E and the text E, the text 3 is disposed on the right of the image 1, the text 1, the text E and the image F, respectively. The sizes and arranged positions of the components constitute the layout information of the document data 500.

When the printing data 400 is generated based on the document data 500, the image data 502, 506, 512 and the text data 504, 508, 510, 514 constitute the partial data 404, respectively, the header information 402 includes the data identifier 410 of the printing data 400 generated based on the document data 500, the respective data identifiers 412 of the image data 502, 506, 512 and the text data 504, 508, 510, 514, and the layout information 414 of the document data 500.

Figure 6:
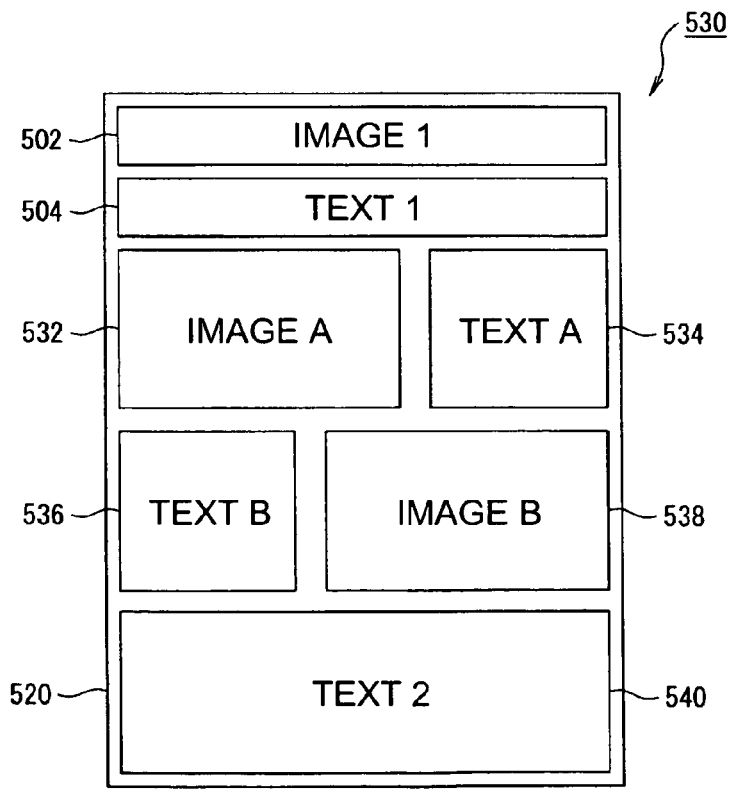
FIG. 6 is a view showing a data structure of document data 530.

FIG. 6 shows a data structure of document data 530.

The document data 530 is constituted by arranging the image data 502, the text data 504, image data 532 representing an image A, text data 534 representing a text A, text data 536 representing a text B, image data 538 representing an image B, and text data 540 representing a text 2 in the layout area 520, as shown in FIG. 6. Here, the text 1 is disposed under the image 1, the image A and the text A are disposed under the text 1, the text B and the image B are disposed under the image A and the text A, and the text 2 is disposed under the text B and the image B, respectively. The sizes and arranged positions of the components constitute the layout information of the document data 530.

When the printing data 400 is generated based on the document data 530, the image data 502, 532, 538 and the text data 504, 534, 536, 540 constitute the partial data 404, respectively, the header information 402 includes the data identifier 410 of the printing data 400 generated based on the document data 530, the respective data identifiers 412 of the image data 502, 532, 538 and the text data 504, 534, 536, 540, and the layout information 414 of the document data 530.

When comparing FIG. 6 with FIG. 5, as the partial data 404, the image data 502 and the text data 504 are duplicated. In the embodiment, when the document data 530 in FIG. 6 is printed after the document data 500 in FIG. 5 is printed, in the printer 200, the printing data 400 generated based on the document data 500 is stored in units of segment at the time of printing, and the data in the storage part is utilized for the image data 502 and the text data 504 and the image data 532, 538 and the text data 534, 536, 540 are acquired from the client unit 100.

Figure 7:
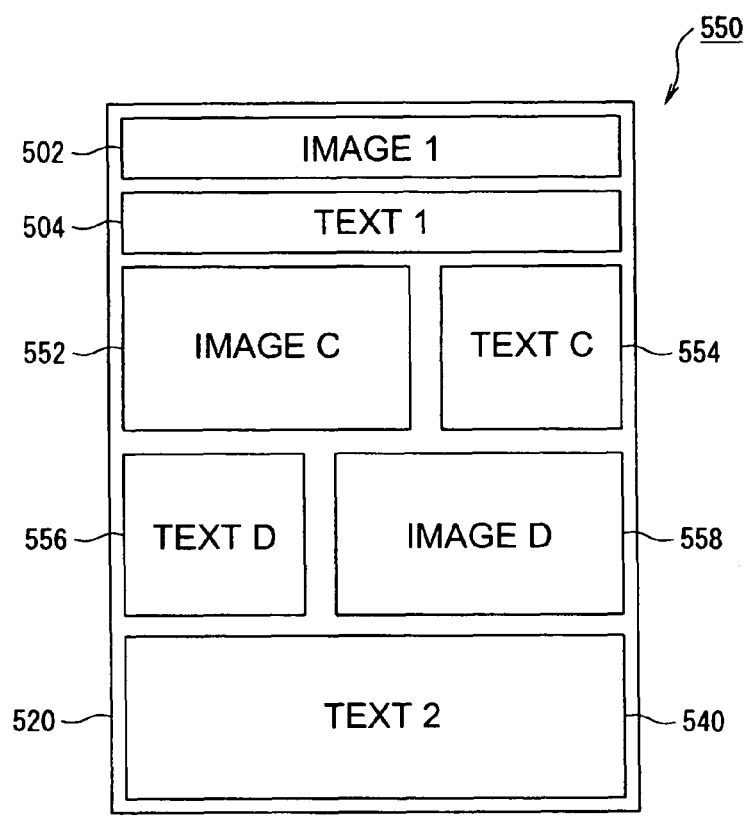
FIG. 7 is a view showing a data structure of document data 550.

FIG. 7 shows a data structure of document data 550.

The document data 550 is constituted by arranging the image data 502, the text data 504, image data 552 representing an image C, text data 554 representing a text C, text data 556 representing a text D, image data 558 representing an image D, and the text data 540 in the layout area 520, as shown in FIG. 7. Here, the text 1 is disposed under the image 1, the image C and the text C are disposed under the text 1, the text D and the image D are disposed under the image C and the text C, the text 2 is disposed under the text D and the image D, respectively. The sizes and arranged positions of the components constitute the layout information of the document data 550.

When the printing data 400 is generated based on the document data 550, the image data 502, 552, 558 and the text data 504, 554, 556, 540 constitute the partial data 404, respectively, the header information 402 includes the data identifier 410 of the printing data 400 generated based on the document data 550, the respective data identifiers 412 of the image data 502, 552, 558 and the text data 504, 554, 556, 540, and the layout information 414 of the document data 550.

When comparing FIG. 7 with FIG. 5, as the partial data 404, the image data 502 and the text data 504 are duplicated. In the embodiment, when the document data 550 in FIG. 7 is printed after the document data 500 in FIG. 5 is printed, in the printer 200, the printing data 400 generated based on the document data 500 is stored in units of segment at the time of printing, and the data in the storage part is utilized for the image data 502 and the text data 504 and the image data 552, 558 and the text data 554, 556, 540 are acquired from the client unit 100.

Further, when comparing FIG. 7 with FIG. 6, as the partial data 404, the text data 540 is duplicated. In the embodiment, when the document data 550 in FIG. 7 is printed after the document data 500, 530 in FIGS. 5 and 6 are printed, in the printer 200, the printing data 400 generated based on the document data 500, 530 is stored in units of segment at the time of printing, and the data in the storage part is utilized for the image data 502 and the text data 504, 540 and the image data 552, 558 and the text data 554, 556 are acquired from the client unit 100.

Turning again to FIG. 2, the storage data registration part 22 allows the storage part 16 to store the printing data 400 generated by the printing data generating part 20 in units of segment. In the case of storing, each partial data 404 that constitutes the printing data 400 is stored in the storage part 16 so as to correspond to the data identifier 412 thereof.

The printing request transmitting part 24 acquires the header information 402 from the printing data 400 generated by the printing data generating part 20, and the printing request including the acquired header information 402 is transmitted to the printer 200.

The client unit 100 is constituted by having a data providing part 26 for providing the partial data 404 stored in the storage part 16 to the printer 200 and a data management part 28 for managing the partial data 404 stored in the storage part 16.

The data providing part 26 searches for partial data 404 from inside the storage part 16 in response to the acquisition request from the printer 200, and transmits the partial data 404 retrieved by the search to the request source printer 200.

When the data management part 28 receives a data presence confirmation request including the data identifier 412, the part searches for the same data identifier 412 as the data identifier 412 included in the received data presence confirmation request from inside the storage part 16, and, when the data identifier 412 of interest is retrieved, a data presence response representing the presence of the partial data 404 is transmitted to the request source printer 200.

Figure 8:
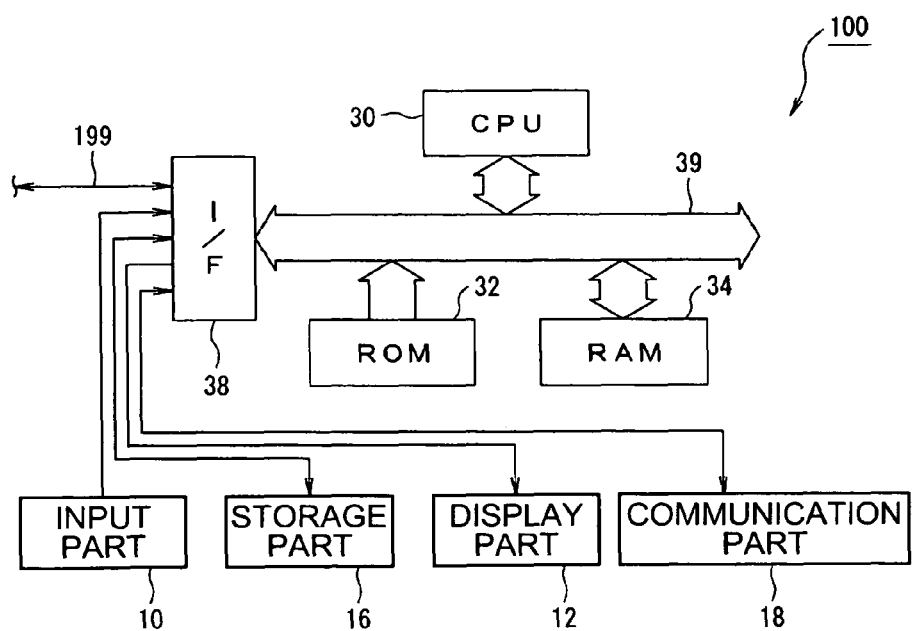
FIG. 8 is a view showing a hardware configuration of the client unit 100.

More specifically, the client unit 100 consists of a general-purpose computer in which an application for document creation and organization is installed and constituted by a CPU 30 for controlling the operation and the whole system based on a control program, a ROM 32 in which the control program etc. are stored, a RAM 34 for storing the data read from the ROM 32 and the like and the operation result required in the operation process of the CPU 30, and an I/F 38 serving as a medium of input and output of data to an external unit, and these are connected by a bus 39 as a signal line for transferring data to each other so as to transmit and receive data, as shown in FIG. 8. To the I/F 38, the input part 10, the display part 12, the storage part 16, and the communication part 18 are connected as the external units.

Figure 9:
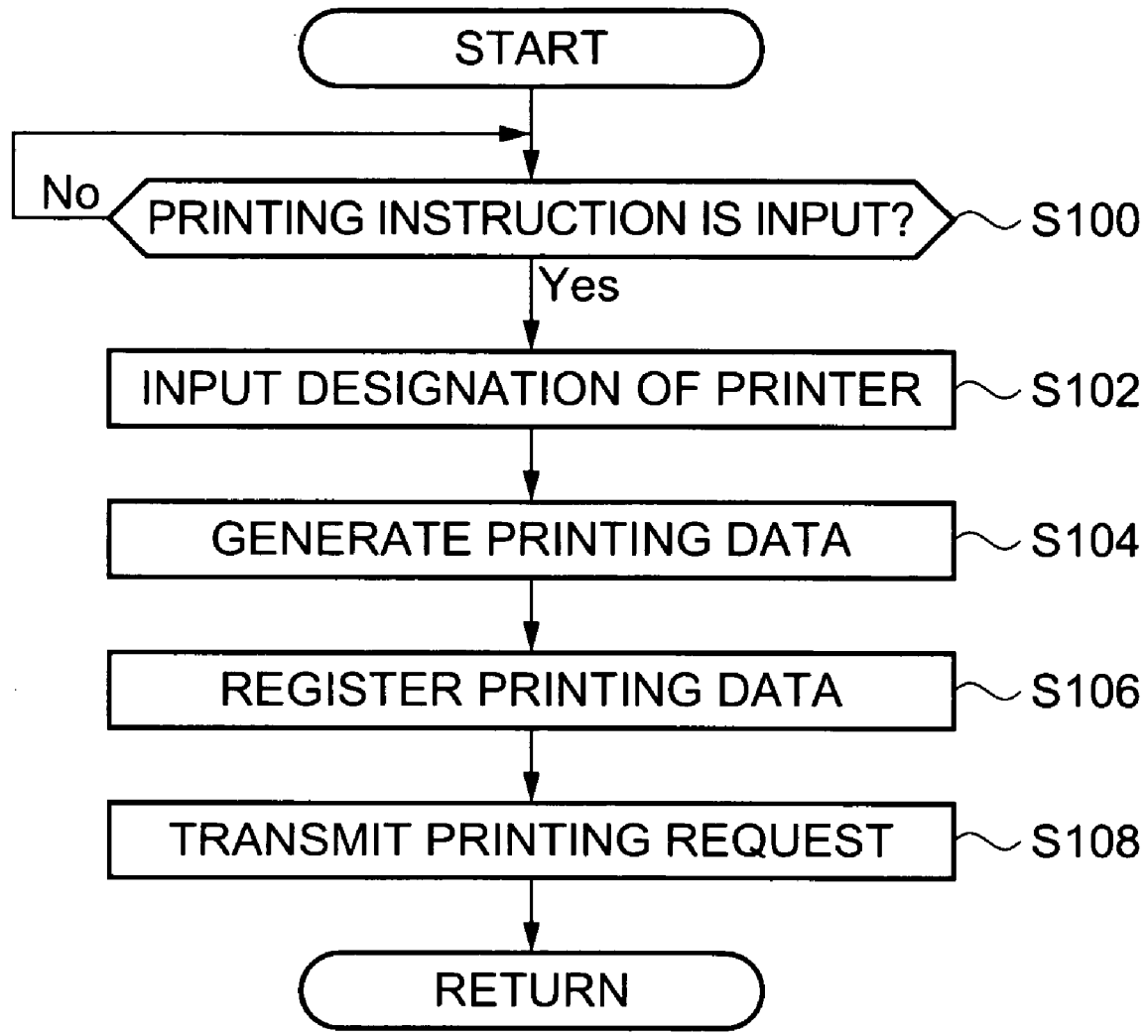
FIG. 9 is a flowchart showing the printing request processing.
Figure 10:
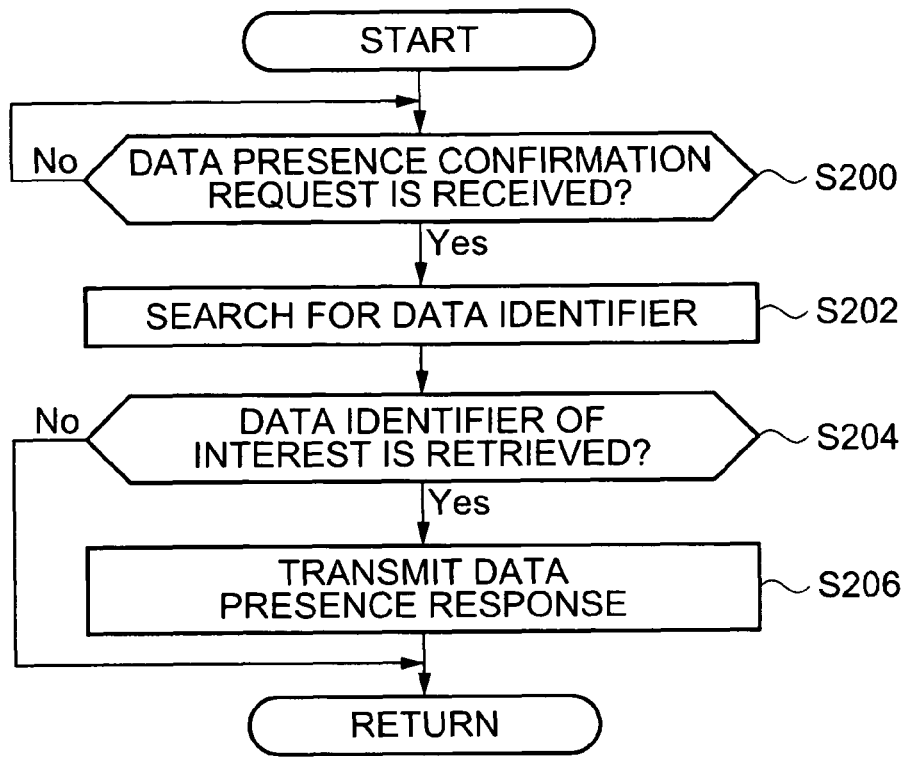
FIG. 10 is a flowchart showing the data presence response processing.
Figure 11:
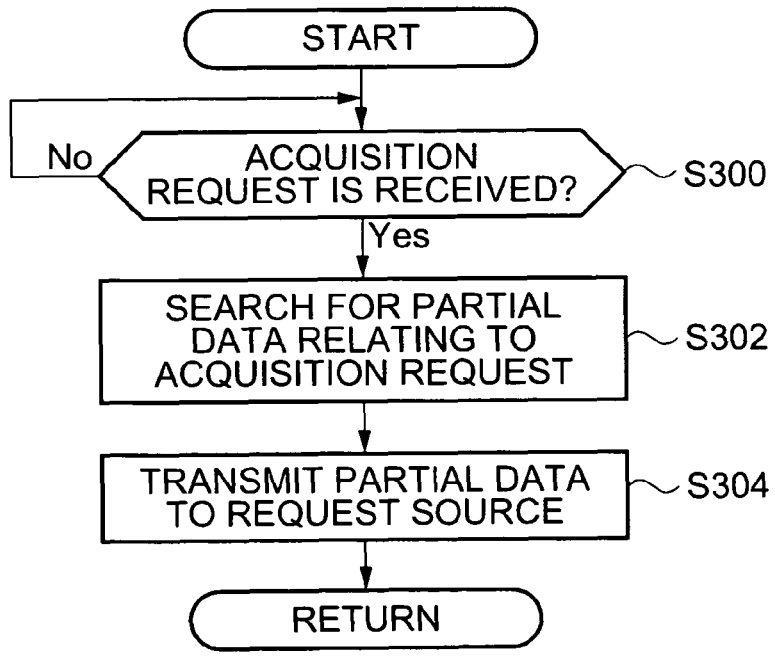
FIG. 11 is a flowchart showing the data providing processing.

The CPU 30 consists of a micro processing unit (MPU) etc. and arranged so as to activate a predetermined program stored in a predetermined area of the ROM 32, and execute the printing request processing, the data presence response processing, and the data providing processing shown in the flowcharts in FIGS. 9 to 11, respectively, in time sharing environment following the program.

First, the printing request processing will be described in detail by referring to FIG. 9.

FIG. 9 is a flowchart showing the printing request processing.

The printing request processing is processing for requesting for printing to the printer 200 designated by the user, and when executed in the CPU 30, as shown in FIG. 8, first, the process moves to step S100.

In step S100, whether or not a printing instruction from the user is input from the input part 10 is determined, and if determined that the printing instruction is input (Yes), the process moves to step S102, but, if determined not input (No), the process waits at step S100 until the printing instruction is input.

In step S102, the designation of the printer 200 is input from the input part 10, the process moves to step S104, the printing data 400 is generated based on the document data designated for printing by the user, and the process moves to step S106.

In step S106, the generated printing data 400 is stored in the storage part 16 in units of segment, the process moves to step S108, the header information 402 is acquired from the generated printing data 400, the printing request including the acquired header information 402 is transmitted to the designated printer 200, and then, the CPU ends the series of processing and returns to the former processing.

Next, the data presence response processing will be described in detail by referring to FIG. 10.

FIG. 10 is a flowchart showing the data presence response processing.

The data presence response processing is processing for performing a presence response if the partial data 404 of interest is present in the storage part 16 to the data presence confirmation request from the printer 200, and when executed in the CPU 30, as shown in FIG. 10, first, the process moves to step S200.

In step S200, whether or not a data presence response request is received is determined, and if determined that the data presence response request is received (Yes), the process moves to step S202, but, if determined not received (No), the process waits at step S200 until the data presence response request is received.

In step S202, the same data identifier 412 as the data identifier 412 included in the received data presence confirmation request is searched for from inside the storage part 16, the process moves to step S204, whether or not the data identifier 412 of interest is retrieved is determined, and, if determined that the data identifier 412 of interest is retrieved (Yes), the process moves to step S206, the data presence response is transmitted to the request source printer 200, and the CPU ends the series of processing and returns to the former processing.

On the other hand, in step S204, if determined that the data identifier 412 of interest is not retrieved (No), the CPU ends the series of processing and returns to the former processing.

Next, the data providing processing will be described in detail by referring to FIG. 11.

FIG. 11 is a flowchart showing the data providing processing.

The data providing processing is processing for providing the partial data 404 in response to the acquisition request from the printer 200, and when executed in the CPU 30, as shown in FIG. 11, first, the process moves to step S300.

In step S300, whether or not the acquisition request is received is determined, and if determined that acquisition request is received (Yes), the process moves to step S302, but, if determined not received (No), the process waits at step S300 until the acquisition request is received.

In step S302, the partial data 404 relating to the acquisition request is searched for from inside the storage part 16, the process moves to step S304, the partial data 404 retrieved by the search is transmitted to the request source printer 200, and the CPU ends the series of processing and returns to the former processing.

Next, the constitution of the printer 200 will be described in detail by referring to FIG. 12.

Figure 12:
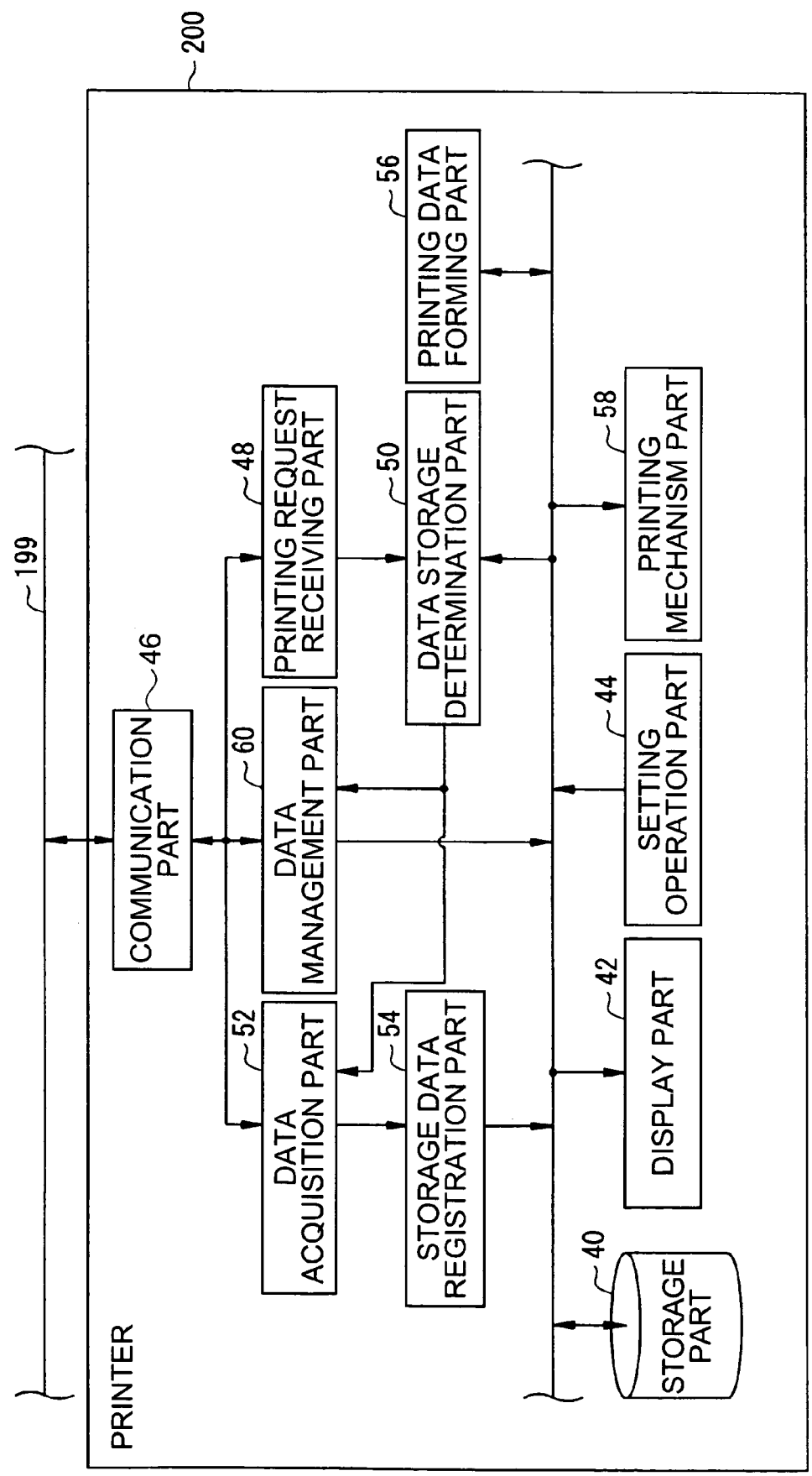
FIG. 12 is a functional block diagram showing the constitution of the printer 200.

FIG. 12 is a functional block diagram showing the constitution of the printer 200.

The printer 200 is, as shown in FIG. 12, constituted by having a storage part 40 including a hard disk etc., a display part 42 including an LCD and the like for displaying error information etc., a setting operation part 44 for performing operation such as forced paper discharge and reset, a communication part 46 as a communication interface for accessing the Internet 199 and performing communication, a printing request receiving part 48 for receiving a printing request, a data storage determination part 50 for analyzing the printing request received by the printing request receiving part 48 and determining whether or not the partial data 404 required for forming the printing data 400 (hereinafter, simply referred as "required partial data 404") is stored in the storage part 40.

The storage part 40 registers hop count information representing the number of connection stages of the router on the communication path to the data acquisition source with plural client units 100 as data acquisition sources with respect to each data acquisition source so as to correspond to the data acquisition source.

The data storage determination part 50 searches for the same data identifier 412 as the data identifier 412 included in the received printing request received by the printing request receiving part 48 from inside the storage part 40, and, if the data identifier 412 of interest is retrieved, determines that the partial data 404 corresponding to the data identifier 412 is stored in the storage part 40, but, if the data identifier 412 of interest is not retrieved, determines that the partial data 404 corresponding to the data identifier 412 is not stored in the storage part 40.

The printer 200 is constituted by further having a data acquisition part 52 for acquiring insufficient partial data 404 for the formation of the printing data 400 (hereinafter, simply referred to as "insufficient partial data 404") from the client unit 100 based on the determination result of the data storage determination part 50, a storage data registration part 54 for storing the partial data 404 acquired by the data acquisition part 52 in the storage part 40, a printing data forming part 56 for forming the printing data 400 based on the partial data 404 of the storage part 40, a printing mechanism part 58 for performing printing based on the printing data 400 formed by the printing data forming part 56, and a data management part 60 for managing the partial data 404 stored in the storage part 40.

The data management part 60 acquires, with respect to the insufficient partial data 404, its data identifier 412 from the printing request based on the determination result of the data storage determination part 50, broadcasts the data presence confirmation request including the acquired data identifier 412, and, if it receives the data presence response, registers address information of the transmission source of the data presence response in the storage part 40 so as to correspond to the data identifier 412. The address information of the transmission source can be acquired from header information of the packet of the data presence response etc., for example.

When there are plural data acquisition sources corresponding to the same data identifier 412 with respect to the insufficient partial data 404, the data acquisition part 52 reads the hop count information corresponding to the data acquisition sources with respect to each data acquisition source from the storage part 40, and selects the source having the least hop count from the data acquisition sources based on the read hop count information. Then, the part reads the address information corresponding to the selected data acquisition source (hereinafter, referred to as "selected data acquisition source") from the storage part 40, and transmits the acquisition request to the selected data acquisition source based on the read address information to acquire the partial data 404. Further, when there is only one data acquisition source corresponding to the same data identifier 412 with respect to the insufficient partial data 404, the part reads the address information corresponding to the data acquisition source from the storage part 40, and transmits the acquisition request to the selected data acquisition source based on the read address information to acquire the partial data 404.

The storage data registration part 54 allows the storage part 40 to store the partial data 404 acquired by the data acquisition part 52 so as to correspond to its data identifier 412. As the data identifier 412, an identifier corresponding to address information may be used, or an identifier newly acquired from the printing request may be used.

When the insufficient partial data 404 is acquired, the printing data forming part 56 constitutes the printing data 400 based on the header information 402 included in the printing request and the partial data 404 in the storage part 40.

Figure 13:
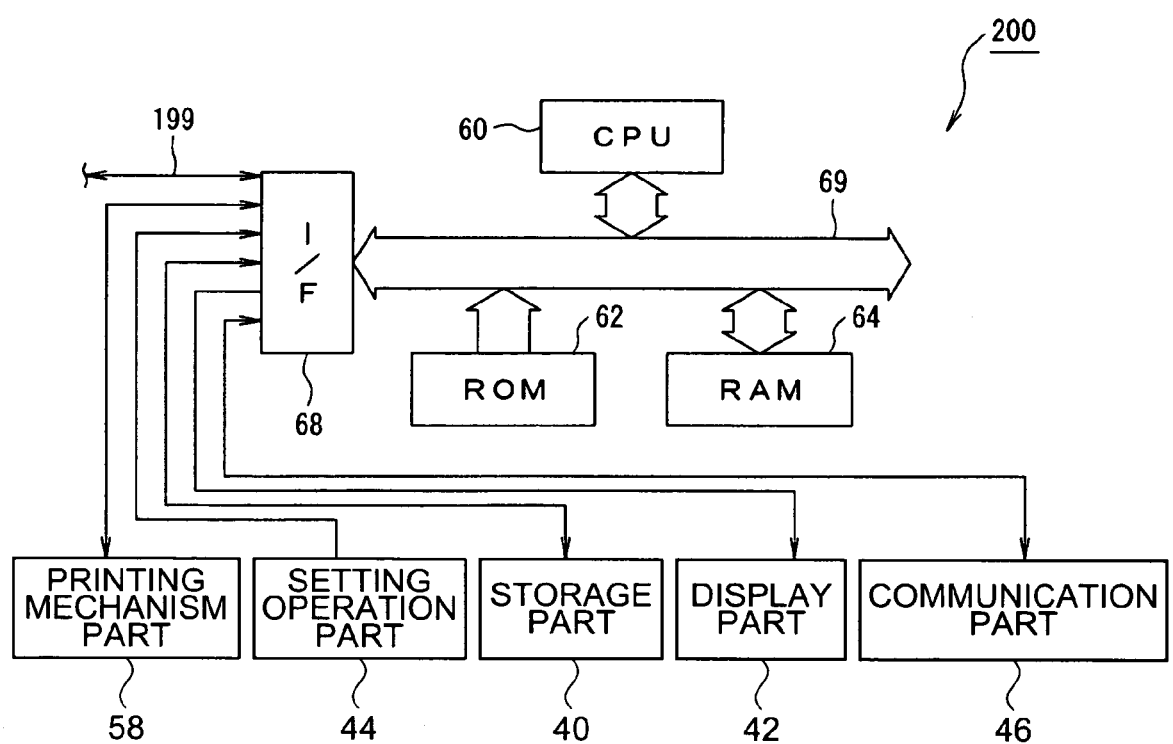
FIG. 13 is a view showing a hardware configuration of the printer 200.

More specifically, the printer 200 is constituted by a CPU 60 for controlling the operation and the whole system based on a control program, a ROM 62 in which the control program etc. are stored, a RAM 64 for storing the data read from the ROM 62 and the like and the operation result required in the operation process of the CPU 60, and an I/F 68 serving as a medium of input and output of data to an external unit, and these are connected by a bus 69 as a signal line for transferring data to each other so as to transmit and receive data, as shown in FIG. 13. To the I/F 68, the storage part 40, the display part 42, the setting operation part 44, the communication part 46, and the printing mechanism part 58 are connected as external units.

Figure 14:
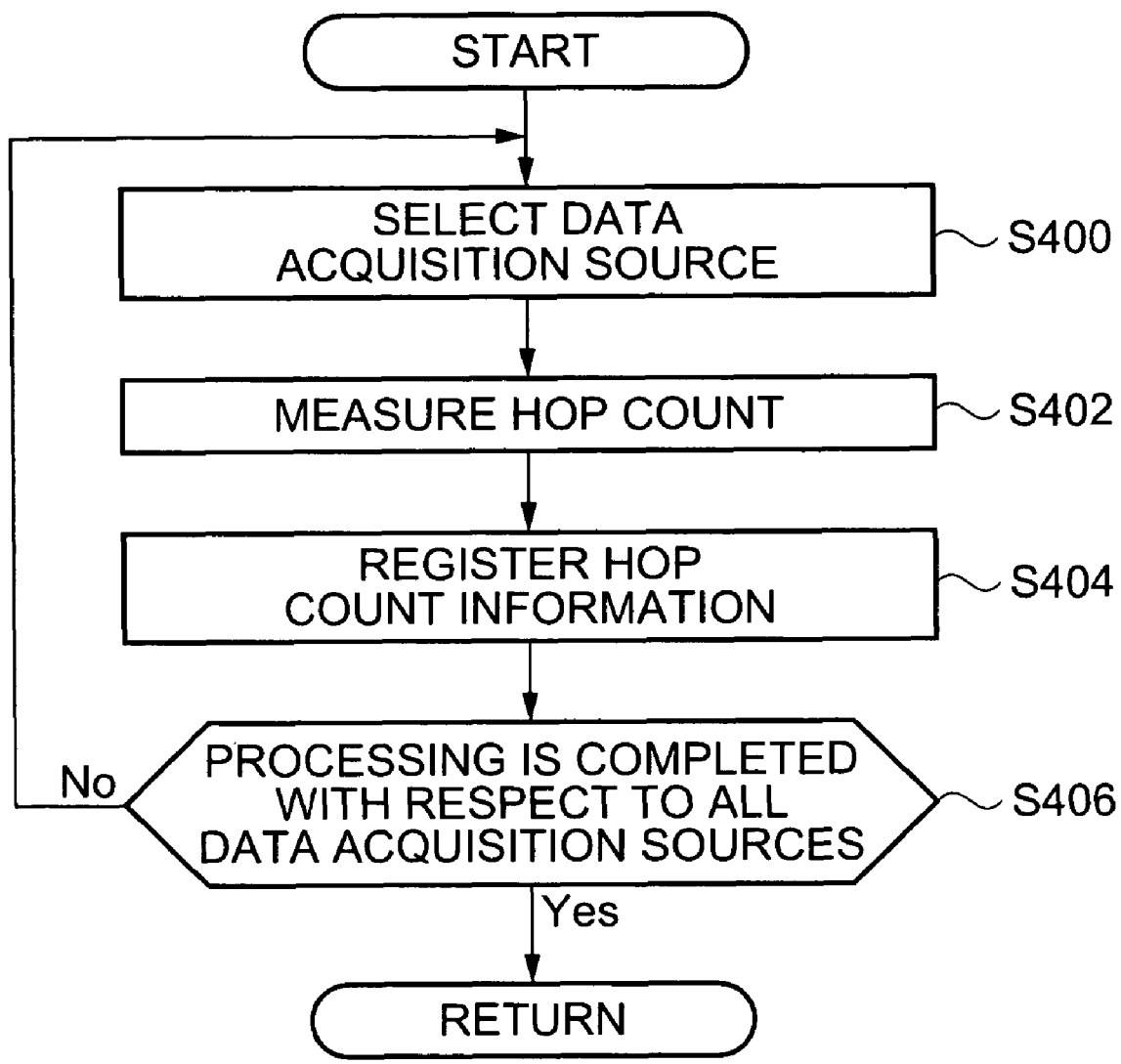
FIG. 14 is a flowchart showing the hop count measurement processing.
Figure 15:
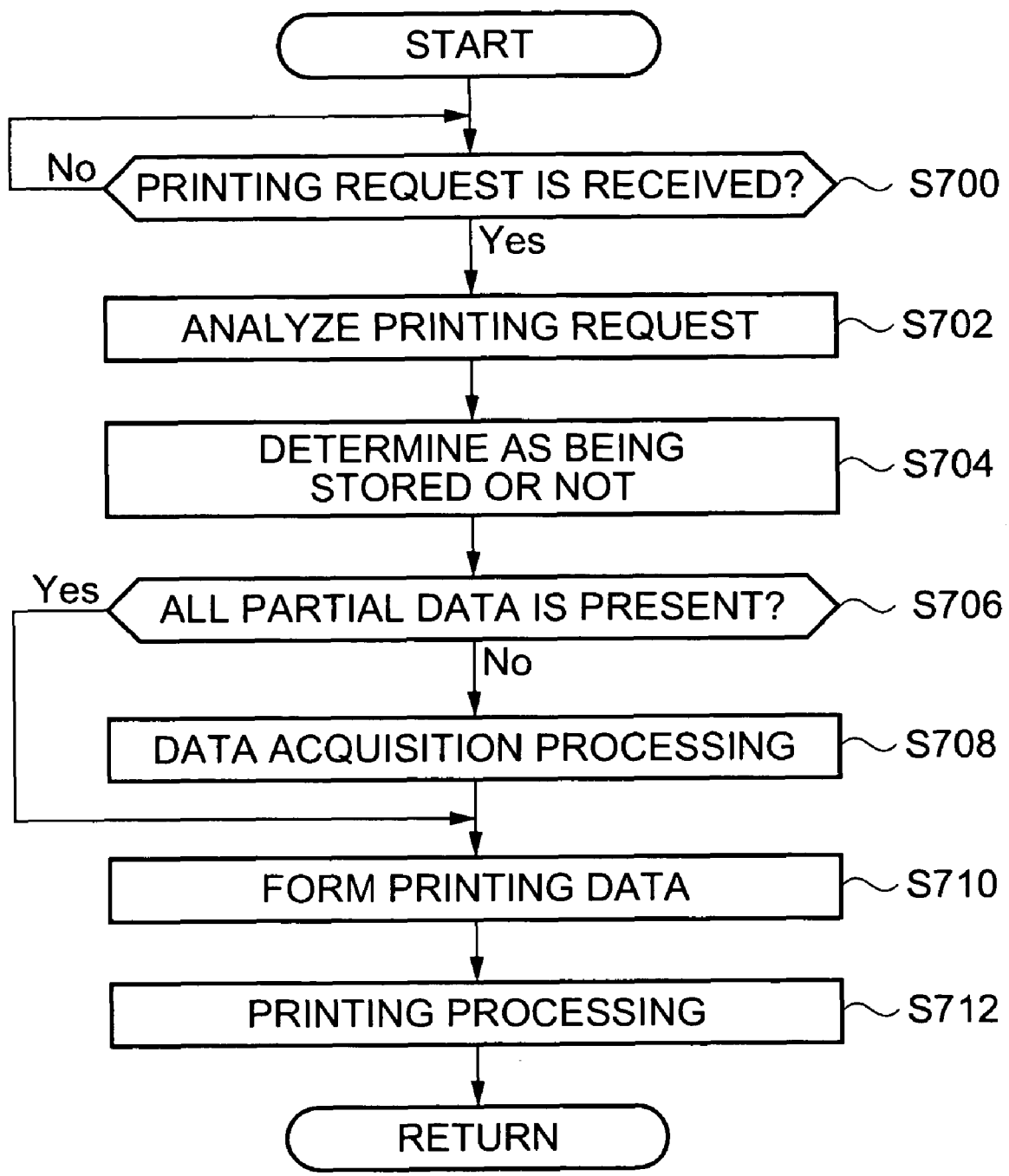
FIG. 15 is a flowchart showing the printing control processing.

The CPU 30 consists of a micro processing unit (MPU) and arranged so as to activate a predetermined program stored in a predetermined area of the ROM 32, and execute hop count measurement processing and printing control processing shown in the flowcharts in FIGS. 14 and 15, respectively, in time sharing environment following the program.

First, the hop count measurement processing will be described in detail by referring to FIG. 14.

FIG. 14 is a flowchart showing the hop count measurement processing.

The hop count measurement processing is processing for measuring the hop count representing the connection stages of the router on the communication path with the data acquisition source with respect to each data acquisition source, and when executed in the CPU 30, as shown in FIG. 14, first, the process moves to step S400.

In step S400, one of the plural data acquisition sources is selected, the process moves to step S402, the hop count is measured by outputting a predetermined net command to the selected data acquisition source, the process moves to step S404, the hop count information representing the measured hop count is registered in the storage part 40 so as to correspond to the data acquisition source, and the process moves to step S406.

In step S406, whether or not the processing of the steps S400 to S404 is completed with respect to all of the data acquisition sources is determined, and, if determined that the processing is completed with respect to all of the data acquisition sources (Yes), the CPU ends the series of processing and returns to the former processing.

On the other hand, if determined that the processing is not completed with respect to all of the data acquisition sources (No) in step S406, the process moves to the step S400 with the next data acquisition source as a target.

Next, the printing control processing will be described in detail by referring to FIG. 15.

FIG. 15 is a flowchart showing the printing control processing.

The printing control processing is processing for performing printing in response to the printing request from the client unit 100, when executed in the CPU 30, as shown in FIG. 15, first, the process moves to step S700.

In step S700, whether or not the printing request is received is determined, and, if determined that the printing request is received (Yes), the process moves to step S702, but, if determined not received (No), the process waits at step S700 until the printing request is received.

In step S702, the received printing request is analyzed, the process moves to step S704, whether or not the required partial data 404 is stored in the storage part 40 is determined based on the analysis result, and the process moves to step S706.

In step S706, whether or not all the required partial data 404 have been stored is determined based on the analysis result of step S704, and, if determined that not all the required partial data 404 have been stored (No), the process moves to step S708, the insufficient partial data 404 is acquired from the data acquisition source, the acquired partial data 404 is stored in the storage part 40, and the process moves to step S710.

In step S710, the printing data 400 is formed based on the header information 402 included in the printing request and the partial data 404 in the storage part 40, the process moves to step S712, printing is performed by the printing mechanism part 58 based on the formed printing data 400, and the CPU ends the series of processing and returns to the former processing.

On the other hand, in step S706, if determined that all the required partial data 404 have been stored (Yes) based on the determination result in step S704, the process moves to step S710.

Next, the data acquisition processing in the step S708 will be described in detail by referring to FIG. 16.

Figure 16:
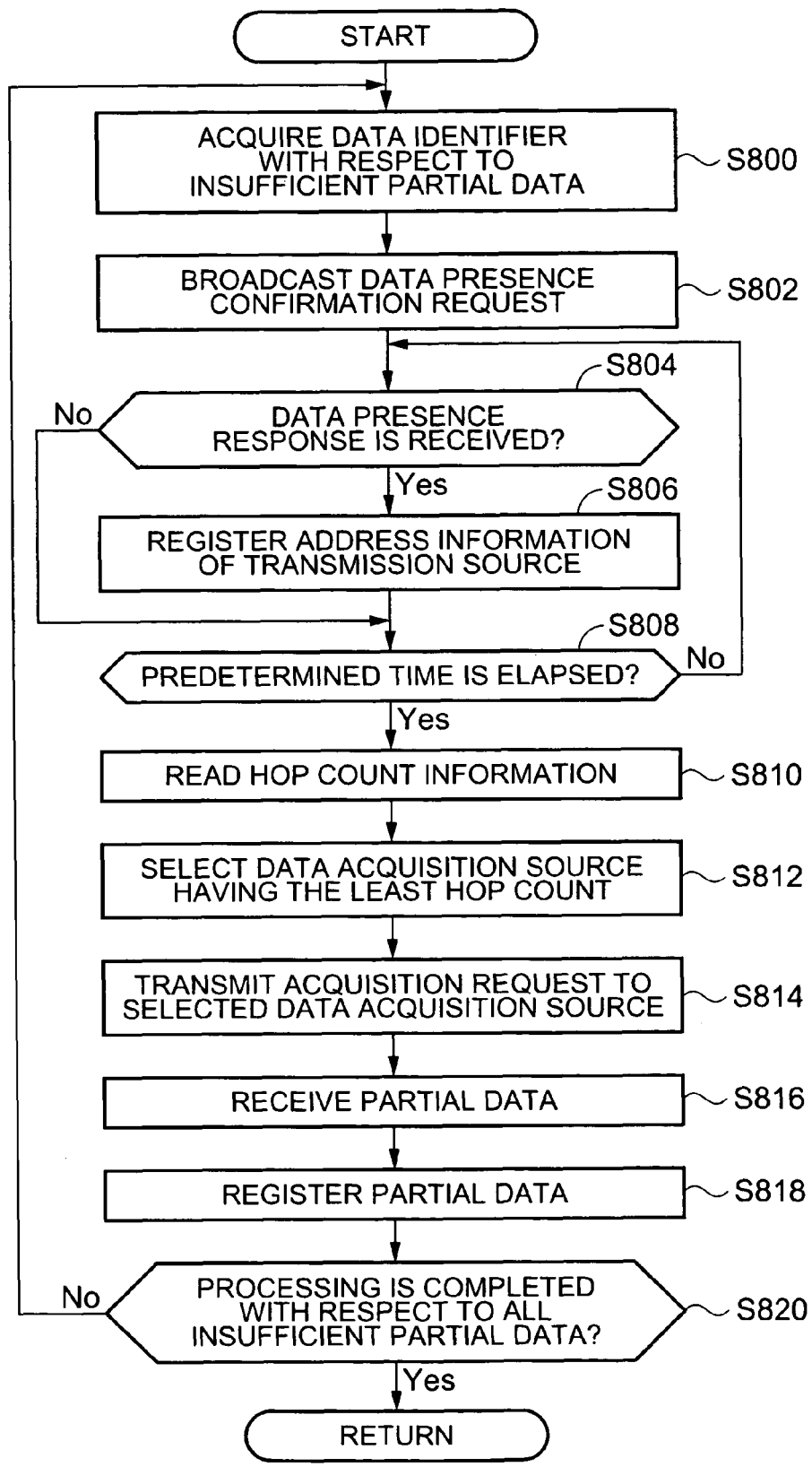
FIG. 16 is a flowchart showing the data acquisition processing.

FIG. 16 is a flowchart showing the data acquisition processing.

The data acquisition processing is processing for acquiring insufficient partial data 404 from the data acquisition source, when executed in the step S708, as shown in FIG. 16, first, the process moves to step S800.

In step S800, with respect to the insufficient partial data 404, its data identifier 412 is acquired from the printing request, the process moves to step S802, the data presence confirmation request including the acquired data identifier 412 is broadcasted, and the process moves to step S804.

In step S804, whether or not the data presence response is received is determined, and, if determined that the data presence response is received (Yes), the process moves to step S806 and address information of the transmission source of the data presence response is registered in the storage part 40 so as to correspond to the data identifier 412. Then, the process moves to step S808, whether or not predetermined time (for example, several seconds) is elapsed from the transmission of the data presence confirmation request is determined, and, if determined that the predetermined time is elapsed (Yes), the process moves to step S810.

In step S810, for the insufficient partial data 404, the hop count information corresponding to the data acquisition sources with respect to each data acquisition source corresponding to the same data identifier 412 from the storage part 40 is read, the process moves to step S812, the one having the least hop count is selected from the data acquisition sources based on the read hop count information, and then the process moves to step S814.

In step S814, the acquisition request is transmitted to the selected data acquisition source based on the read address information, the process moves to step S816, the partial data 404 is received, the process moves to step S818, the received partial data 404 is registered so as to correspond to the data identifier 412 in the storage part 40, and then, the process moves to step S820.

In step S820, whether or not the processing of the steps S800 to S818 is completed with respect to all the insufficient partial data 404 is determined, and, if determined that the processing is completed with respect to all of the insufficient partial data 404 (Yes), the CPU ends the series of processing and returns to the former processing.

On the other hand, in step S820, if determined that the processing of the steps S800 to S818 is completed with respect to not all of the insufficient partial data 404 (No), the process moves to the step S800 with the next insufficient partial data 404 as a target.

On the other hand, in step S808, if determined that the predetermined time is not elapsed from the transmission of the data presence confirmation request (No), the process moves to step S804.

On the other hand, in step S804, if determined that the data presence response is not received (No), the process moves to step S808.

Next, the operation of the embodiment will be described.

In the printer 200, through the steps S400 to S404, repeatedly, with respect to each data acquisition source, the hop count for the data acquisition source is measured, and the hop count information representing the measured hop count is stored so as to correspond to the data acquisition source in the storage part 40. The measurement of the hop count is performed in every printer 200 in advance.

When the user performs printing of document data, the user provides an instruction for printing of document data and designates the printer 200 for performing printing in the client unit 100. In the client unit 100, when the printing instruction of the document data and the designation of the printer 200 are input, through steps S104 and S106, the printing data 400 is generated based on the document data to which the user has provided an instruction for printing, and the generated printing data 400 is stored in the storage part 16 in units of segments. Further, through step S108, the header information 402 is acquired from the generated printing data 400, and the printing request including the acquired header information 402 is transmitted to the designated printer 200.

In the printer 200, when the printing request is received, through steps S702 and S704, the received printing request is analyzed and whether or not the required partial data 404 have been stored in the storage part 40 is determined. As a result, if determined that not all of the required partial data 404 have been stored, through steps S800 and S802, with respect to the insufficient partial data 404, its data identifier 412 is acquired from the printing request, and the data presence confirmation request including the acquired data identifier 412 is broadcasted.

In the client unit 100, when the data presence confirmation request is received, through step S202, the same data identifier 412 as the data identifier 412 included in the received data presence confirmation request is searched for from inside the storage part 16. As a result, when the data identifier 412 of interest is retrieved, through step S206, the data presence response is transmitted to the request source printer 200.

In the printer 200, when the data presence response is received within predetermined time, through step S806, the address information of the transmission source of the data presence response is registered so as to correspond to the data identifier 412 in the storage part 40. Subsequently, through steps S810 and S812, with respect to each data acquisition source, the hop count information corresponding to the data acquisition source is read from the storage part 40, and the source having the least hop count is selected from the data acquisition sources based on the read hop count information. Then, through step S814, the acquisition request is transmitted to the selected data acquisition source based on the read address information.

When the selected data acquisition source is a client unit 100, in the client unit 100, when the acquisition request is received, because the partial data 404 of interest is present, through steps S302 and S304, the partial data 404 relating to the acquisition request is searched for from inside of the storage part 16, and the partial data 404 retrieved by the search is transmitted to the request source printer 200.

In the printer 200, when the insufficient partial data 404 is received, through step S818, the received partial data 404 is registered so as to correspond to the data identifier 412 in the storage part 40. Such processing is performed on all of the insufficient partial data 404. Then, when all of the required partial data 404 are obtained, through steps S710 and S712, the printing data 400 is formed based on the header information 402 included in the printing request and the partial data 404 of the storage part 40, and printing is performed by the printing mechanism part 58 based on the formed printing data 400.

As described above, in the embodiment, the client unit 100 is arranged so as to generate the printing data 400 formed by segmenting the data with respect to each component that constitutes the printing contents, transmits the printing request including the header information 402 to the printer 200, search for the partial data 404 from inside the storage part 16 in response to the acquisition request, and transmit the partial data 404 retrieved by the search to the request source printer 200. The printer 200 is arranged, when the printing request is received, to analyze the received printing request, determine whether or not the required partial data 404 is stored in the storage part 40, acquire the insufficient partial data 404 from the client unit 100 having a small hop count, store the acquired partial data 404 in the storage part 40, form the printing data 400 based on the partial data 404 of the storage part 40, and perform printing based on the formed printing data 400.

Thereby, when a part of required printing data 400 for the printer 200 matches the printing data 400 of the storage part 40 and the other part is different, since only the data of the different part is transferred on the network, compared with the conventional example, the network traffic volume can be reduced and the time elapsed before first print out can be shortened. Further, since the partial data 404 is acquired from the source at a shorter communication distance on the network of the plural client units 100, the acquisition of the partial data 404 can be performed relatively faster, and the shortening of the time elapsed before first print out can be achieved.

Furthermore, in the embodiment, the printer 200 is arranged so as to acquire the insufficient partial data 404 from the source having a small hop count of the plural client units 100.

Thereby, since the partial data 404 is acquired from the source at a shorter communication distance on the network of the plural client units 100, the acquisition of the partial data 404 can be performed relatively faster, and the shortening of the time elapsed before first print out can be achieved.

In the embodiment, the client unit 100 corresponds to the first data processing unit of aspect 1, 13, etc., the storage part 16 corresponds to the first data storage means of aspect 1, 2, 7, etc., the printing data generating part 20 and step S104 correspond to the printing data generating means of aspect 3. Further, the storage data registration part 22 and step S106 correspond to the first storage data registration means of aspect 2 or 7, or the first storage data registration step of aspect 35 etc., the printing request transmitting part 24 and step S108 correspond to the printing request transmitting means of aspect 3.

Further, in the embodiment, the data providing part 26 and steps S300 to S304 correspond to the storage data searching means of aspect 1, the first storage data searching means of aspect 2, the first partial data transmitting means of aspect 2, or the partial data transmitting means of aspect 1, and the data providing part 26 and steps S300 to S304 correspond to the storage data searching step, the first storage data searching step, the partial data transmitting step, or the first partial data transmitting step of aspect 35 etc. Further, the data management part 28 and steps S200 to S206 correspond to the first data management means of aspect 7.

In the embodiment, the printer 200 corresponds to the second data processing unit of aspect 1 etc., the storage part 40 corresponds to the hop count information storage means of aspect 4 or the address information storage means of aspect 7, and the printing request receiving part 48 and step S700 correspond to the printing request receiving means of aspect 3. Further, the data storage determination part 50 and steps S702 and S704 correspond to the data storage determination means of aspect 3, and the data acquisition part 52 and steps S810 to S816 correspond to the partial data acquisition means of aspect 1 to 4, 7, 13, etc. or the partial data acquisition step of aspect 35, etc.

Further, in the embodiment, the printing data forming part 56 and step S710 correspond to processing data forming means of aspect 1, 13, or 15, the printing data forming means of aspect 2, 3, 14, etc., the processing data forming step of aspect 17, or the printing data forming step of aspect 18. Further, the printing mechanism part 58 and step S712 correspond to the printing means of aspect 2, 14, etc. or the printing step, and the data management part 60 and steps S800 to S808 correspond to the second data management means of aspect 7.

In the embodiment, the printing data 400 corresponds to processing data of aspect 1, 13, etc., the layout information 414 corresponds to the structure information of aspect 3, and the data identifier 412 corresponds to the identification information of aspect 3 or 7.

By the way, in the embodiment, the printer 200 is arranged so as to select the one having the least hop count from the plural data acquisition sources and acquire the partial data 404 from the selected data acquisition source, however, not limited to that, the printer may be arranged so as to measure, with respect to each data acquisition source, the time for arrival elapsed before a packet arrives at the data acquisition source, register time for arrival information representing the measured time for arrival so as to correspond to the data acquisition source in the storage part 40, select the one having the shortest time for arrival of the plural data acquisition sources based on the time for arrival information of the storage part 40, and acquire the partial data 404 from the selected data acquisition source.

Thereby, since the partial data 404 is acquired from the source having shorter communication time on the network of the plural client units 100, the acquisition of the partial data 404 can be performed relatively faster and the shortening of the time elapsed before first print out can be achieved.

In this case, the storage part 40 corresponds to the time for arrival information storage means of aspect 5.

Further, in the embodiment, the printer 200 is arranged so as to select the one having the least hop count from the data acquisition sources and acquire the partial data 404 from the selected data acquisition source, however, not limited to that, the printer may be arranged so as to measure, with respect to each data acquisition source, the communication cost required until a packet arrives at the data acquisition source, register communication cost information representing the measured communication cost so as to correspond to the data acquisition source in the storage part 40, select the one having the lowest communication cost of the plural data acquisition sources based on the communication cost information of the storage part 40, and acquire the partial data 404 from the selected data acquisition source.

Thereby, since the partial data 404 is acquired from the source having lower communication cost of the plural client units 100, the printing cost can be relatively reduced.

In this case, the storage part 40 corresponds to the communication cost information storage means of aspect 6.

Further, in the embodiment, the printer 200 is arranged so as to make inquiries about the insufficient partial data 404 to the plural client units 100 by broadcast, however, not limited to that, the client unit 100 may be arranged so as to notify the printer 200 of the partial data 404 stored in itself by broadcast. Specifically, the client unit is arranged as below.

The client unit 100, with respect to each partial data 404 of the storage part 16, reads the data identifier 412 corresponding to the partial data 404 from the storage part 16 and broadcasts the data presence notification including the read data identifier 412.

When the data presence notification is received, the printer 200 registers the address information of the transmission source of the data presence notification so as to correspond to the data identifier 412 included in the received data presence notification in the storage part 40, acquires, with respect to the insufficient partial data 404, its data identifier 412 from the printing request, reads the address information corresponding to the acquired data identifier 412 from the storage part 40, transmits the acquisition request to the acquisition source of the partial data 404 based on the read address information, and acquires the partial data 404. Further, the printer reads, with respect to each partial data 404 of the storage part 40, the data identifier 412 corresponding to the partial data 404 from the storage part 40 and broadcasts the data presence notification including the read data identifier 412.

In this case, the storage part 16 corresponds to the first data storage means of aspect 8, the storage part 40 corresponds to the address information storage means of aspect 8, and the data identifier 412 corresponds to the identification information of aspect 8.

Further, in the embodiment, the printer 200 is arranged so as to make inquiries about the insufficient partial data 404 to the plural client units 100 by broadcast, however, not limited to that, the printer 200 may be arranged so as to make inquiries about the insufficient partial data 404 to the specified client unit 100, receive the address information from the client unit 100, and acquire the insufficient partial data 404 from the selected data acquisition source. Specifically, the client unit is arranged as below.

The client unit 100 acquires, with respect to the partial data 404 stored in the storage part 16, its data identifier 412 and registers its address information so as to correspond to the acquired data identifier 412 in the storage part 40. Further, when the data presence notification is received, the client unit registers the address information of the transmission source of the data presence notification so as to correspond to the data identifier 412 included in the received data presence notification in the storage part 40. When the data presence confirmation request is received, the client unit reads the address information corresponding to the data identifier 412 included in the received data presence confirmation request from the storage part 40 and transmits the data presence response including the read address information to the request source printer 200.

The printer 200 acquires, with respect to the insufficient partial data 404, its data identifier 412 and transmits the data presence confirmation request including the acquired data identifier 412 to the client unit 100. Then, when the data presence response is received, the printer transmits the acquisition request to the data acquisition source based on the address information included in the received data presence response to acquire the partial data 404. Further, the printer acquires, with respect to the partial data 404 stored in the storage part 40, its data identifier 412 and transmits the data presence notification including the acquired data identifier 412 to the client unit 100.

Thereby, since the partial data 404 stored in the client unit 100 is managed by the specific client unit 100, the printer 200 can acquire the partial data 404 that has been stored in the data acquisition source only by making inquiries to the specific client unit 100.

In this case, the storage part 16 corresponds to the first data storage means of aspect 9 or 10 or address information storage means of aspect 9 or 10, and the data identifier 412 corresponds to the identification information of aspect 9 or 10.

Further, in the embodiment, the printer 200 is arranged so as to make inquiries about the insufficient partial data 404 to the plural client units 100 by broadcast, however, not limited to that, a data management server is provided on the Internet 199, and the printer 200 is arranged so as to make inquiries about the insufficient partial data 404 to the data management server, receive the address information from the data management server, and acquire the insufficient partial data 404. Specifically, the server is arranged as below.

When the data presence notification is received, the data management server registers the address information of the transmission source of the data presence notification so as to correspond to the data identifier 412 included in the received data presence notification in a predetermined storage part. When the data presence confirmation request is received, the server reads the address information corresponding to the data identifier 412 included in the received data presence confirmation request from the predetermined storage part and transmits the data presence response including the read address information to the request source printer 200.

The client unit 100 acquires, with respect to the partial data 404 stored in the storage part 16, its data identifier 412 and transmits the data presence notification including the acquired data identifier 412 to the data management server.

The printer 200 acquires, with respect to the insufficient partial data 404, its data identifier 412 and transmits the data presence confirmation request including the acquired data identifier 412 to the data management server. Then, when the data presence response is received, the printer transmits the acquisition request to the data acquisition source based on the address information included in the received data presence response and acquires the partial data 404. Further, the printer acquires, with respect to the partial data 404 stored in the storage part 40, its identifier 412 and transmits the data presence notification including the acquired data identifier 412 to the data management server.

Thereby, since the partial data 404 stored in the client unit 100 is managed by the data management server, the printer 200 can acquire the partial data 404 that has been stored in the data acquisition source only by making inquiries to the data management server.

In this case, the data management server corresponds to the data management terminal of aspect 11 or 12, the storage part 16 corresponds to the first data storage means of aspect 12, and the data identifier 412 corresponds to the identification information of aspect 11 or 12.

Further, in the embodiment, the storage data registration part 54 is arranged so as to store all the partial data 404 acquired by the data acquisition part 52 in the storage part 40 as a general rule, however, the storage data registration part 54 may include a printing number counting part for counting the number of times of execution of printing with respect to each partial data 404 that has been actually printed and a data storage determination part for determining the execution of storage in response to the number of times of printing counted by the printing number counting part, and arranged so as to determine as being stored or not according to the number of printing times.

Thereby, since only the frequently used partial data 404 can be stored, the limited storage capacity of the storage part 40 can be effectively utilized. That is, as described above, a storage device actually used as the storage part 40 is a storage including a hard disk, a magnetic tape storage, a semiconductor storage, or the like, and this is because, naturally, there are limits for the storage capacity of the storages and, if all the partial data 404 actually printed are stored, its capacity is filled in a short time and any more data can not be stored.

Furthermore, in the embodiment, the printer 200 is arranged so as to analyze the printing request and determines the insufficient partial data 404, however, for example, when the printer 200 is dedicated to a certain client unit 100 and never receives the printing request from other client units 100, by the client unit 100, the partial data 404 stored in the printer 200 can be grasped accurately. Accordingly, in such case, the partial data 404 is transferred not in wait for the acquisition request, but, when the printing request is transmitted to the printer 200, transferred with the partial data 404 that is not stored in the printer 200 together, and thereby, the network traffic volume can be reduced and the time elapsed before first print out can be shortened. In this case, furthermore, the transmission and reception of the acquisition request do not occur, the network traffic volume can be further reduced and the time elapsed before first print out can be further shortened.

Further, a data deletion part for deleting the partial data 404 stored in the storage part 40 is provided in the printer 200, actually stored use intervals with respect to each partial data 404 are measured, only the partial data 404 having a use interval over a fixed period is deleted, and thereby, the stored data of the partial data 404 once stored but not used for a long period is deleted from the printer 200, and only the frequently used partial data 404 is left and the limited storage capacity of the printer 200 can be effectively utilized.

Further, when partial data 404 is created by the client unit 100, whether or not the partial data 404 is stored in the printer 200 is checked, and, when not stored, only the new partial data 404 has been transferred to and stored in the printer 200 in advance at a suitable time before performing the printing request by a suitable method, and thereby, even if the network traffic volume becomes large when a printing request using the partial data 404 is transmitted, the printer 200 can execute printing processing immediately, and the time elapsed before first print out can be further shortened.

Here, when the data is thus transferred in advance while the time when the network is available is timed, congestion of the network is avoided and other communication is not affected, and even a large amount of printing data can be transferred to the printer 200 efficiently in a short period.

Further, when the data transfer is performed using a fixed network band, the network load can be made uniform, and thereby, the effect on other communication can be reduced.

In particular, the invention is expected to exert a remarkable effect not only on the printer 200, but also in the case of a network in which various kinds of servers and devices are mixed in the same network and various communications can be performed constantly.

Furthermore, when the data to be transferred is divided into plural pieces and the transfer is performed in units of divided data, similarly, the network load can be made uniform, and thereby, the effect on other communication can be reduced.

In particular, the invention can exert a more remarkable effect when applied to the environment of a network in which, as a general rule, during one data communication, other communication can not be performed, such as a LAN adopting the CSMA/CD system, for example, than the network environment in which the data is packet transferred like the Internet 199.

On the other hand, when the Internet 199 has plural paths and the printing request and the data transfer are performed by selecting a suitable path from those paths, when the regular communication path is incommunicable or congested, reliable communication between the client unit 100 and the printer 200 can be realized by selecting other path appropriately.

Further, in the embodiment, the protocol used in the communication between the client unit 100 and the printer 200 is not limited, but TCP/IP (Transmission Control Protocol/Internet Protocol), which is standard in the Internet 199, can be used, and, as long as a LAN is unified by a certain vender, a specified protocol such as Apple Talk/Ether Talk (registered trademark), NetBEUI/NetBIOS (registered trademark), and SPX/IPX (registered trademark) can be used.

For example, as the TCP/IP, other than TCP (Transmission Control Protocol) for ensuring reliable communication by establishing the connection between the client unit 100 and the printer 200, UDP (User Datagram Protocol) as a protocol of connectionless type for providing efficient communication, IP (Internet Protocol) as a protocol for deliver a packet to a predetermined address of a number of paths, Telnet (Telecommunication Network) as a protocol for remote controlling the other end terminal via a network, FTP (File Transfer Protocol) as a protocol for executing file transfer using Telnet, NFS (Network File System) as a protocol for providing a transparent file access function to other computers of the printer 200 to the client unit 100, SNMP (Simple Network Management Protocol) as a protocol for exchanging network information such as failure information and network traffic information, ARP and RARP (Address Resolution Protocol, Reverse ARP), SLIP and PPP (Serial Line Protocol, Point to Point Protocol), RIP and OSPF (Routing Information Protocol, Open Shortest Path First), RSVP (Resource Reservation Protocol), IPSec (IP Security Protocol), IGMP (Internet Group Management Protocol), NTP (Network Time Protocol), etc. can be used.

Further, as the client unit 100, other than a personal computer as a general-purpose computer, network-capable devices such as a cellular phone, PHS (registered trademark) (Personal Handyphone System), PDA (Personal Digital Assistant), switchboard, NCU (Network Control Unit), router, hub, bridge, gateway, POS (Point Of Sale) terminals, etc. can also be used.

Further, in the embodiment, when any processing shown in the flowcharts of FIGS. 9 to 11 and 14 to 16 is executed, the case where the control program stored in the ROM 32 in advance is executed is described, however, not limited to that, the processing may be executed by reading a program from a storage medium in which the program describing these procedures is recorded in the RAM 34.

Here, the storage medium is a semiconductor storage medium such as RAM, ROM, etc., a magnetic storage medium such as FD, HD, etc., an optical reading storage medium such as CD, CDV, LD, DVD, etc., and a magnetic storage/optical reading storage medium such as MO, and, whatever the reading method such as electronic, magnetic, and optical methods is, as long as the storage medium is readable by the computer, includes various storage mediums.

Further, in the embodiment, the case where the network data processing system, network printing system, data processing unit, printer, data processing program and printing processing program, and network data processing method and network printing method according to the invention are applied to the network system in the form of the Internet 199 is described, however, not limited to that, for example, they may be applied to a so-called intranet that performs communication by the same system as the Internet 199. Needless to add, not limited to the network in which communication is performed by the same system as the Internet 199, they may be applied to a general network.

Further, in the embodiment, the network data processing system, network printing system, data processing unit, printer, data processing program and printing processing program, and network data processing method and network printing method according to the invention are applied to the case where the printing is performed in the printer 200 in response to the printing request from the client unit 100 as shown in FIG. 1, however, not limited to that, they may be applied to other cases in the range without any departure from the intent of the invention.

What is claimed is:

1. A network data processing system comprising:
   plural first data processing units; and
   a second data processing unit, the plural first data processing units and the second processing unit connected to a network;
   wherein said first data processing unit includes:
      first data storage means for storing at least a part of processing data formed by segmenting data with respect to each component that constitutes processing contents in units of said segment;
      storage data searching means for searching for partial data corresponding to said component from inside said first data storage means in response to an acquirement request from said second data processing unit; and
      partial data transmitting means for transmitting the partial data retrieved by said storage data searching means to said second data processing unit,
   said second data processing unit includes:
      partial data acquisition means for acquiring partial data required for forming said processing data from said first data processing unit; and
      processing data forming means for forming said processing data based on the partial data acquired by said partial data acquisition means; and
   said partial data acquisition means is arranged to acquire said partial data from at least one of:
      the first data processing unit having the shortest data transfer time; and
      the first data processing unit estimated to have the shortest data transfer time, of said plural first data processing units.

2. A network printing system comprising:
   plural data processing units; and
   a printer, the plural data processing units and the printer connected to a network;
   wherein said data processing unit includes:
      first data storage means for storing at least a part of printing data formed by segmenting data with respect to each component that constitutes printing contents in units of said segment;
      first storage data registration means for storing said printing data in said first data storage means;
      first storage data searching means for searching for said partial data from inside said first data storage means in response to an acquirement request from said printer; and
      first partial data transmitting means for transmitting the partial data retrieved by said first storage data searching means to said printer,
   said printer includes:
      partial data acquisition means for acquiring partial data required for forming said printing data from said data processing unit;
      printing data forming means for forming said printing data based on the partial data acquired by said partial data acquisition means; and
      printing means for performing printing based on the printing data formed by said printing data forming means; and
   said partial data acquisition means is arranged to acquire said partial data from at least one of:
      the data processing unit having the shortest data transfer time; and
      the data processing unit estimated to have the shortest data transfer time, of said plural data processing units.

3. The network printing system according to claim 2, wherein:
   said data processing unit further comprises:
      printing data generating means for generating said printing data; and
      printing request transmitting means for transmitting a printing request including structure information representing said segment structure with respect to the printing data generated by said printing data generating means and identification information for identifying partial data corresponding to each of said components to said printer,
   said printer further comprises:
      second data storage means for storing a part or whole of said printing data in units of said segment;
      printing request receiving means for receiving said printing request;
      data storage determination means for analyzing the printing request received by said printing request receiving means and determining whether the partial data required for forming said printing data is stored in said second data storage means; and
      second storage data registration means for storing the partial data acquired by said partial data acquisition means in said second data storage means,
   said partial data acquisition means is arranged to acquire insufficient partial data for the formation of said printing data based on a determination result of said data storage determination means from said data processing unit, and
   said printing data forming means is arranged to form said printing data based on the partial data acquired by said partial data acquisition means and the partial data of said second data storage means.

4. The network printing system according to claim 2, wherein:
   said printer further comprises:
      hop count information storage means for storing hop count information representing a hop count that indicates, with said plural data processing units as data acquisition sources, respectively, with respect to each of said data acquisition sources, the number of connection stages of a repeater on a communication path with the data acquisition source of interest so as to correspond to the data acquisition source of interest, and
   said partial data acquisition means is arranged to, with respect to each of said data acquisition sources:

read the hop count information corresponding to the data acquisition source of interest from said hop count information storage means;

select one having the least hop count from said plural data acquisition sources based on the read hop count information; and acquire said partial data from the selected data acquisition source.

5. The network printing system according to claim 2, wherein:

said printer further comprises time for arrival information storage means for storing time for arrival information representing, with said plural data processing units as data acquisition sources, respectively, with respect to each of said data acquisition sources, the time for arrival elapsed before a packet arrives at the data acquisition source of interest so as to correspond to the data acquisition source of interest, said partial data acquisition means is arranged to, with respect to each of said data acquisition sources:

read the time for arrival information corresponding to the data acquisition source of interest from said time for arrival information storage means;

select one having the shortest time for arrival from said plural data acquisition sources based on the read time for arrival information; and acquire said partial data from the selected data acquisition source.

6. A network printing system comprising:

plural data processing units; and a printer, the plural data processing units and the printer connected to a network;

wherein said data processing unit includes:

first data storage means for storing at least a part of printing data formed by segmenting data with respect to each component that constitutes printing contents in units of said segment;

first storage data registration means for storing said printing data in said first data storage means;

first storage data searching means for searching for said partial data from inside said first data storage means in response to an acquirement request from said printer; and first partial data transmitting means for transmitting the partial data retrieved by said first storage data searching means to said printer, said printer includes communication cost information storage means for storing communication cost information representing, with said plural data processing units as data acquisition sources, respectively, with respect to each of said data acquisition sources, communication cost required for communication with the data acquisition source of interest so as to correspond to the data acquisition source of interest, and said partial data acquisition means is arranged to, with respect to each of said data acquisition sources:

read the communication cost information corresponding to the data acquisition source of interest from said communication cost information storage means;

select one having the lowest communication cost from said plural data acquisition sources based on the read communication cost information; and acquire said partial data from the selected data acquisition source.

7. The network printing system according to claim 6, wherein:

said data processing unit further comprises first data management means for managing the partial data stored in said first data storage means, said printer further comprises second data management means for managing said partial data and address information storage means for storing address information, said first storage data registration means is arranged to store the partial data in said first data storage means with respect to each partial data that forms said printing data so as to correspond to identification information for identifying the partial data of interest, said second data management means is arranged to:

acquire, with respect to the partial data required for forming said printing data, the identification information for identifying the partial data of interest;

broadcast a data presence confirmation request including the acquired identification information; and if the means receives a data presence response representing the presence of said partial data, register address information of the transmission source of the data presence response of interest in said address information storage means, said first data management means is arranged to:

search for the same identification information as the identification information included in the received data presence confirmation request from inside said first data storage means, if the means receives said data presence confirmation request; and transmit said data presence response to said printer, if the identification information of interest is retrieved; and said partial data acquisition means is arranged to:

read the address information corresponding to said acquisition source of the partial data from said address information storage means; and acquire said partial data from said data acquisition source based on the read address information.

8. The network printing system according to claim 6, wherein:

said data processing unit further comprises first data management means for managing the partial data stored in said first data storage means;

said printer further comprises second data management means for managing said partial data and address information storage means for storing address information;

said first storage data registration means is arranged to store the partial data in said first data storage means with respect to each partial data that forms said printing data so as to correspond to identification information for identifying the partial data of interest;

said first data management means is arranged to, with respect to each partial data of said first data storage means, read the identification information corresponding to the partial data of interest from said first data storage means and broadcast a data presence notification including the read identification information;

said second data management means is arranged to, if the means receives said data presence notification, register address information of the transmission source of the data presence notification of interest in said address information storage means so as to correspond to the identification information included in the received data presence notification, and said partial data acquisition means is arranged to:

acquire, with respect to the partial data required for forming said printing data, the identification information for identifying the partial data of interest;

read the address information corresponding to the acquired identification information from said address information storage means; and acquire said partial data from said acquisition source of the partial data based on the read address information.

9. The network printing system according to claim 6, wherein:
said data processing unit further comprises:
first data management means for managing the partial data stored in the first data storage means; and
address information storage means for storing address information,
said first data management means is arranged to:
register, with said data processing unit as a data acquisition source, the address information of the data acquisition source in which said partial data is stored in said address information storage means so as to correspond to the identification information for identifying the partial data of interest;
read the address information corresponding to the identification information included in a received data presence confirmation request from said address information storage means, if the means receives the data presence confirmation request including said identification information; and
transmit a data presence response including read address information to said printer, and
said partial data acquisition means is arranged to:
acquire, with respect to the partial data required for forming said printing data, the identification information for identifying the partial data of interest;
transmit the data presence confirmation request including the acquired identification information to said data processing unit having said first data management means; and
acquire said partial data from said data acquisition source based on the address information included in the received data presence response, if the means receives said data presence response.

10. The network printing system according to claim 9, wherein:
said first data management means is arranged to acquire, with respect to the partial data stored in said first data storage means, the identification information for identifying the partial data of interest and register the address information of the data processing unit of interest in said address information storage means so as to correspond to the acquired identification information.

11. The network printing system according to claim 6, wherein:
with said data processing unit as a data acquisition source, a data management terminal for managing storage data of said data acquisition source is connected to said network,
said data management terminal has data management means for managing the storage data of said data acquisition source and address information storage means for storing address information,
said data management means is arranged to:
register the address information of the data acquisition source in which said partial data is stored in said address information storage means so as to correspond to the identification information for identifying the partial data of interest;
if the means receives a data presence confirmation request including said identification information, read the address information corresponding to the identification information included in the received data presence confirmation request from said address information storage means; and
transmit a data presence response including the read address information to said printer; and
said partial data acquisition means is arranged to:
acquire, with respect to the partial data required for forming said printing data, the identification information for identifying the partial data of interest;
transmit the data presence confirmation request including the acquired identification information to said data management terminal; and
if the means receives said data presence response, acquire said partial data from said data acquisition source based on the address information included in the received data presence response.

12. The network printing system according to claim 11, wherein:
said data processing unit further comprises first data management means for managing the partial data stored in said first data storage means,
said first data management means is arranged to acquire, with respect to the partial data stored in said first data storage means, the identification information for identifying the partial data of interest and transmit a data presence notification including the acquired identification information to said data management terminal, and
said data management means is arranged to, if the means receives said data presence notification, register address information of the transmission source of the data presence notification of interest in said address information storage means so as to correspond to the identification information included in the received data presence notification.

13. The network data processing system according to claim 1, further comprising:
a data processing unit connected to the first data processing unit via the network;
wherein the data processing unit includes:
partial data acquisition means for acquiring partial data required for forming processing data formed by segmenting data with respect to each component that constitutes processing contents from said first data processing unit; and
processing data forming means for forming said processing data based on the partial data acquired by said partial data acquisition means; and
said partial data acquisition means is arranged to acquire said partial data from at least one of:
the first data processing unit having the shortest data transfer time; and
the first data processing unit estimated to have the shortest data transfer time, of said plural first data processing units.

14. The network printing system according to claim 2 further comprising:
a printer connected to the data processing unit via the network;
wherein the printer includes:
partial data acquisition means for acquiring partial data required for forming printing data formed by segmenting data with respect to each component that constitutes printing contents from said data processing unit;
printing data forming means for forming said printing data based on the partial data acquired by said partial data acquisition means; and
printing means for performing printing based on the printing data formed by said printing data forming means; and said partial data acquisition means is arranged to acquire said partial data from at least one of:
  the data processing unit having the shortest data transfer time; and
  the data processing unit estimated to have the shortest data transfer time, of said plural data processing units.

15. A printer connected to plural data processing units via a network, the printer comprising:
  partial data acquisition means for acquiring partial data required for forming printing data formed by segmenting data with respect to each component that constitutes printing contents from said data processing unit;
  printing data forming means for forming said printing data based on the partial data acquired by said partial data acquisition means; and
  printing means for performing printing based on the printing data formed by said printing data forming means;
  wherein said partial data acquisition means is arranged to acquire said partial data from the data processing unit having the shortest data transfer time of said plural data processing units.

16. The printer according to claim 15, further comprising:
  second data storage means for storing at least a part of said printing data in units of said segment;
  printing request receiving means for receiving the printing request from said data processing unit;
  data storage determination means for analyzing the printing request received by said printing request receiving means and determining whether the partial data required for forming said printing data is stored in said second data storage means; and
  second storage data registration means for storing the partial data acquired by said partial data acquisition means in said second data storage means; and
  wherein said partial data acquisition means is arranged to acquire insufficient partial data for the formation of said printing data based on a determination result of said data storage determination means from said data processing unit; and
  said printing data forming means is arranged to form said printing data based on the partial data acquired by said partial data acquisition means and the partial data of said second data storage means.

17. The printer according to claim 15, further comprising:
  hop count information storage means for storing hop count information representing a hop count that indicates, with said plural data processing units as data acquisition sources, respectively, with respect to each of said data acquisition sources, the number of connection stages of a repeater on a communication path with the data acquisition source of interest so as to correspond to the data acquisition source of interest; and
  wherein said partial data acquisition means is arranged to with respect to each of said data acquisition sources:
    read the hop count information corresponding to the data acquisition source of interest from said hop count information storage means;
    select one having the least hop count from said plural data acquisition sources based on the read hop count information; and
    acquire said partial data from the selected data acquisition source.

18. The printer according to claim 15, further comprising:
  time for arrival information storage means for storing time for arrival information representing, with said plural data processing units as data acquisition sources, respectively, with respect to each of said data acquisition sources, the time for arrival elapsed before a packet arrives at the data acquisition source of interest so as to correspond to the data acquisition source of interest, and
  wherein said partial data acquisition means is arranged to, with respect to each of said data acquisition sources:
    read the time for arrival information corresponding to the data acquisition source of interest from said time for arrival information storage means;
    select one having the shortest time for arrival from said plural data acquisition sources based on the read time for arrival information; and
    acquire said partial data from the selected data acquisition source.

19. The printer according to claim 15, further comprising:
  communication cost information storage means for storing communication cost information representing, with said plural data processing units as data acquisition sources, respectively, with respect to each of said data acquisition sources, communication cost required for communication with the data acquisition source of interest so as to correspond to the data acquisition source of interest; and
  wherein said partial data acquisition means is arranged to, with respect to each of said data acquisition sources:
    read the communication cost information corresponding to the data acquisition source of interest from said communication cost information storage means;
    select one having the lowest communication cost from said plural data acquisition sources based on the read communication cost information; and
    acquire said partial data from the selected data acquisition source.

20. The printer according to claim 15, further comprising:
  second data management means for managing said partial data and address information storage means for storing address information;
  wherein said second data management means is arranged to:
  acquire, with the partial data required for forming said printing data, the identification information for identifying the partial data of interest;
    broadcast a data presence confirmation request including the acquired identification information; and
    if the means receives a data presence response representing the presence of said partial data, register address information of the transmission source of the data presence response of interest in said address information storage means; and
  said partial data acquisition means is arranged to:
    read the address information corresponding to said acquisition source of the partial data from said address information storage means; and
    acquire said partial data from said data acquisition source based on the read address information.

21. The printer according to claim 15, the printer further comprising:
  second data management means for managing said partial data and address information storage means for storing address information;
  wherein said second data management means is arranged to, when the means receives a data presence notification from said data processing unit, register the address information of the transmission source of the data presence notification of interest in said address information storage means so as to correspond to the identification information included in the received data presence notification; and said partial data acquisition means is arranged to:
acquire, with respect to the partial data required for forming said printing data, the identification information for identifying the partial data of interest;
read the address information corresponding to the acquired identification information from said address information storage means; and
acquire said partial data from said acquisition source of the partial data based on the read address information.

22. The printer according to claim 15, wherein:
said partial data acquisition means is arranged to:
acquire, with respect to the partial data required for forming said printing data, the identification information for identifying the partial data of interest;
transmit a data presence confirmation request including the acquired identification information to said data processing unit; and
if the means receives a data presence response, acquire said partial data from said data acquisition source based on the address information included in the received data presence response.

23. The printer according to claim 15, wherein:
said partial data acquisition means is arranged to:
acquire, with respect to the partial data required for forming said printing data, the identification information for identifying the partial data of interest;
transmit a data presence confirmation request including the acquired identification information, when a data management terminal is connected, to the data management terminal of interest; and
if the means receives said data presence response, acquire said partial data from said data acquisition source based on the address information included in the received data presence response.

24. The network data processing system according to claim 1, further comprising:
a data processing program for performing data processing by performing communication with the first data processing unit via the network;
wherein the program enables a computer to execute the processing realized as:
partial data acquisition means for acquiring partial data required for forming processing data formed by segmenting data with respect to each component that constitutes processing contents from said first data processing unit; and
processing data forming means for forming said processing data based on the partial data acquired by said partial data acquisition means; and
said partial data acquisition means is arranged to acquire said partial data from at least one of:
the first data processing unit having the shortest data transfer time; and
the first data processing unit estimated to have the shortest data transfer time, of said plural first data processing units.

25. The network printing system according to claim 2, further comprising:
a printing processing program for performing printing processing by performing communication with the data processing unit via the network;
wherein the program enables a computer to execute the processing realized as:
partial data acquisition means for acquiring partial data required for forming printing data formed by segmenting data with respect to each component that constitutes printing contents from said data processing unit;
printing data forming means for forming said printing data based on the partial data acquired by said partial data acquisition means; and
printing means for performing printing based on the printing data formed by said printing data forming means; and
said partial data acquisition means is arranged to acquire said partial data from at least one of:
the data processing unit having the shortest data transfer time; and
the data processing unit estimated to have the shortest data transfer time, of said plural data processing units.

26. A non-transitory computer readable medium storing a printing processing program for executing printing processing by performing communication with plural data processing units via a network, comprising:
steps for enabling a computer to execute the processing realized as:
partial data acquisition means for acquiring partial data required for forming printing data formed by segmenting data with respect to each component that constitutes printing contents from said data processing unit;
printing data forming means for forming said printing data based on the partial data acquired by said partial data acquisition means; and
printing means for performing printing based on the printing data formed by said printing data forming means; and
wherein said partial data acquisition means is arranged to acquire said partial data from at least one of:
the data processing unit having the shortest data transfer time; and
the data processing unit estimated to have the shortest data transfer time of said plural data processing units.

27. The non-transitory computer readable medium storing a printing processing program according to claim 26, further comprising:
steps for enabling the computer to execute the processing realized as:
second data storage means for storing at least a part of said printing data in units of said segment;
printing request receiving means for receiving a printing request from said data processing unit;
data storage determination means for analyzing the printing request received by said printing request receiving means and determining whether the partial data required for forming said printing data is stored in said second data storage means; and
second storage data registration means for storing the partial data acquired by said partial data acquisition means in said second data storage means; and
wherein said partial data acquisition means is arranged to acquire insufficient partial data for the formation of said printing data based on a determination result of said data storage determination means from said data processing unit, and
said printing data forming means is arranged to form said printing data based on the partial data acquired by said partial data acquisition means and the partial data of said second data storage means.

28. The non-transitory computer readable medium storing a printing processing program according to claim 26, further comprising:
steps for enabling the computer to execute the processing realized as hop count information storage means for storing hop count information representing a hop count that indicates, with said plural data processing units as data acquisition sources, respectively, with respect to each of said data acquisition sources, the number of connection stages of a repeater on a communication path with the data acquisition source of interest so as to correspond to the data acquisition source of interest; and wherein said partial data acquisition means is arranged to, with respect to each of said data acquisition sources:

read the hop count information corresponding to the data acquisition source of interest from said hop count information storage means;

select one having the least hop count from said plural data acquisition sources based on the read hop count information; and acquire said partial data from the selected data acquisition source.

29. The non-transitory computer readable medium storing a printing processing program according to claim 26, further comprising:

steps for enabling the computer to execute the processing realized as time for arrival information storage means for storing time for arrival information representing, with said plural data processing units as data acquisition sources, respectively, with respect to each data acquisition source, the time for arrival elapsed before a packet arrives at the data acquisition source of interest so as to correspond to the data acquisition source of interest; and wherein said partial data acquisition means is arranged to, with respect to each of said data acquisition sources:

read the time for arrival information corresponding to the data acquisition source of interest from said time for arrival information storage means;

select one having the shortest time for arrival from said plural data acquisition sources based on the read time for arrival information; and acquire said partial data from the selected data acquisition source.

30. The non-transitory computer readable medium storing a printing processing program according to claim 26, further comprising:

steps for enabling the computer to execute the processing realized as communication cost information storage means for storing communication cost information representing, with said plural data processing units as data acquisition sources, respectively, with respect to each of said data acquisition sources, communication cost required for communication with the data acquisition source of interest so as to correspond to the data acquisition source of interest, and wherein said partial data acquisition means is arranged to, with respect to each of said data acquisition sources:

read the communication cost information corresponding to the data acquisition source of interest from said communication cost information storage means;

select one having the lowest communication cost from said plural data acquisition sources based on the read communication cost information; and acquire said partial data from the selected data acquisition source.

31. The non-transitory computer readable medium storing a printing processing program according to claim 26, further comprising:

steps for enabling the computer to execute the processing realized as:

second data management means for managing said partial data; and address information storage means for storing address information;

wherein said second data management means is arranged to:

acquire, with respect to the partial data required for forming said printing data, the identification information for identifying the partial data of interest;

broadcast a data presence confirmation request including the acquired identification information; and if the means receives a data presence response representing the presence of said partial data, register address information of the transmission source of the data presence response of interest in said address information storage means; and said partial data acquisition means is arranged to:

read the address information corresponding to said acquisition source of the partial data from said address information storage means; and acquire said partial data from said data acquisition source based on the read address information.

32. The non-transitory computer readable medium storing a printing processing program according to claim 26, further comprising:

steps for enabling the computer to execute the processing realized as:

second data management means for managing said partial data; and address information storage means for storing address information;

wherein said second data management means is arranged to, when the means receives a data presence notification from said data processing unit, register the address information of the transmission source of the data presence notification of interest in said address information storage means so as to correspond to the identification information included in the received data presence notification, and said partial data acquisition means is arranged to:

acquire, with respect to the partial data required for forming said printing data, the identification information for identifying the partial data of interest;

read the address information corresponding to the acquired identification information from said address information storage means; and acquire said partial data from said acquisition source of the partial data based on the read address information.

33. The non-transitory computer readable medium storing a printing processing program according to claim 26, wherein:

said partial data acquisition means is arranged to:

acquire, with respect to the partial data required for forming said printing data, the identification information for identifying the partial data of interest;

transmit a data presence confirmation request including the acquired identification information to said data processing unit; and if the means receives a data presence response, acquire said partial data from said data acquisition source based on the address information included in the received data presence response.

34. The non-transitory computer readable medium storing a printing processing program according to claim 26, wherein:

said partial data acquisition means is arranged to:

acquire, with respect to the partial data required for forming said printing data, the identification information for identifying the partial data of interest;

transmit a data presence confirmation request including the acquired identification information, when a data management terminal is connected, to the data management terminal of interest; and if the means receives said data presence response, acquire said partial data from said data acquisition source based on the address information included in the received data presence response.

35. A network data processing method for connecting plural first data processing units and a second data processing unit to a network and performing data processing by communication between said first data processing units and said second data processing unit, the method comprising:

steps for said second data processing unit including:
a partial data acquisition step for acquiring partial data required for forming processing data formed by segmenting data with respect to each component that constitutes processing contents from at least one of:
the first data processing unit having the shortest data transfer time; and
the first data processing unit estimated to have the shortest data transfer time, of said plural first data processing units;

steps for said first data processing unit including:
a storage data searching step for searching for said partial data from inside first storage means in response to an acquirement request from said second data processing unit; and
a partial data transmitting step for transmitting the partial data retrieved in said storage data searching step to said second data processing unit, and for said second data processing unit, a processing data forming step for forming said processing data based on the partial data acquired in said partial data acquisition step.

36. A network printing method for connecting plural data processing units and a printer to a network and performing printing processing by communication between said data processing units and said printer, the method comprising:

steps for said data processing unit including:
a first storage data registration step for storing printing data formed by segmenting data with respect to each component that constitutes printing contents in first data storage means;

steps for said printer including:
a partial data acquisition step for acquiring partial data required for forming said printing data from at least one of:
the data processing unit having the shortest data transfer time; and
the data processing unit estimated to have the shortest data transfer time, of said plural data processing units; and further steps for said data processing unit including:
a first storage data searching step for searching for said partial data from inside said first storage means in response to an acquirement request from said printer; and
a first partial data transmitting step for transmitting the partial data retrieved in said first storage data searching step to said printer;

further steps for said printer including:
a printing data forming step for forming said printing data based on the partial data acquired in said partial data acquisition step; and a printing step for performing printing based on the printing data formed in said printing data forming step.

37. A network data processing system comprising:
plural first data processing units; and
a second data processing unit, the plural first data processing units and the second processing unit connected to a network;
wherein said first data processing unit includes:
a first data storage unit that stores at least a part of processing data formed by segmenting data with respect to each component that constitutes processing contents in units of said segment;
a storage data searcher that searches for partial data corresponding to said component from inside said first data storage unit in response to an acquirement request from said second data processing unit; and
a partial data transmitter that transmits the partial data retrieved by said storage data searcher to said second data processing unit,
said second data processing unit includes:
a partial data acquirer that acquires partial data required for forming said processing data from said first data processing unit; and
a processing data former that forms said processing data based on the partial data acquired by said partial data acquirer; and
said partial data acquirer is arranged to acquire said partial data from at least one of:
the first data processing unit having the shortest data transfer time; and
the first data processing unit estimated to have the shortest data transfer time, of said plural first data processing units.

38. A network printing system comprising:
plural data processing units; and
a printer, the plural data processing units and the printer connected to a network;
wherein said data processing unit includes:
a first data storage unit that stores at least a part of printing data formed by segmenting data with respect to each component that constitutes printing contents in units of said segment;
a first storage data register that stores said printing data in said first data storage unit;
a first storage data searcher that searches for said partial data from inside said first data storage unit in response to an acquirement request from said printer; and
a first partial data transmitter that transmits the partial data retrieved by said first storage data searcher to said printer,
said printer includes:
a partial data acquirer that acquires partial data required for forming said printing data from said data processing unit;
a printing data former that forms said printing data based on the partial data acquired by said partial data acquirer; and
a printing unit that performs printing based on the printing data formed by said printing data former; and
said partial data acquirer is arranged to acquire said partial data from at least one of:
the data processing unit having the shortest data transfer time; and
the data processing unit estimated to have the shortest data transfer time, of said plural data processing units.

39. The network printing system according to claim 38, wherein:
- said data processing unit further comprises:
  - a printing data generator that generates said printing data; and
  - a printing request transmitter for transmitting a printing request including structure information representing said segment structure with respect to the printing data generated by said printing data generator and identification information for identifying partial data corresponding to each of said components to said printer,
- said printer further comprises:
  - a second data storage unit that stores at least a part of said printing data in units of said segment;
  - a printing request receiver that receives said printing request;
  - a data storage determination unit for analyzing the printing request received by said printing request receiver and determines whether the partial data required for forming said printing data is stored in said second data storage unit; and
  - a second storage data register for storing the partial data acquired by said partial data acquirer in said second data storage unit,
- said partial data acquirer is arranged to acquire insufficient partial data for the formation of said printing data based on a determination result of said data storage determination unit from said data processing unit, and
- said printing data former is arranged to form said printing data based on the partial data acquired by said partial data acquirer and the partial data of said second data storage unit.

40. The network printing system according to claim 38, wherein:
- said printer further comprises:
  - a hop count information storage unit that stores hop count information representing a hop count that indicates, with said plural data processing units as data acquisition sources, respectively, with respect to each of said data acquisition sources, the number of connection stages of a repeater on a communication path with the data acquisition source of interest so as to correspond to the data acquisition source of interest, and
- said partial data acquirer is arranged to, with respect to each of said data acquisition sources:
  - read the hop count information corresponding to the data acquisition source of interest from said hop count information storage unit;
  - select one having the least hop count from said plural data acquisition sources based on the read hop count information; and
  - acquire said partial data from the selected data acquisition source.

41. The network printing system according to claim 38, wherein:
- said printer further comprises a time for arrival information storage unit that stores time for arrival information representing, with said plural data processing units as data acquisition sources, respectively, with respect to each of said data acquisition sources, the time for arrival elapsed before a packet arrives at the data acquisition source of interest so as to correspond to the data acquisition source of interest,
- said partial data acquirer is arranged to, with respect to each of said data acquisition sources:
  - read the time for arrival information corresponding to the data acquisition source of interest from said time for arrival information storage unit;
  - select one having the shortest time for arrival from said plural data acquisition sources based on the read time for arrival information; and
  - acquire said partial data from the selected data acquisition source.

* * * * *